United States Patent
Sato

(10) Patent No.: US 7,356,344 B2
(45) Date of Patent: Apr. 8, 2008

(54) POSITION INFORMATION ACQUISITION APPARATUS AND METHOD

(75) Inventor: Tatsuhiro Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 31 days.

(21) Appl. No.: 10/751,485

(22) Filed: Jan. 6, 2004

(65) Prior Publication Data
US 2004/0148402 A1    Jul. 29, 2004

Related U.S. Application Data

(63) Continuation of application No. PCT/JP01/05978, filed on Jul. 10, 2001.

(51) Int. Cl.
    *H04Q 7/20* (2006.01)
(52) U.S. Cl. ............... 455/456.3; 455/456.1; 455/404.2; 455/457; 709/727
(58) Field of Classification Search .......... 455/456.3, 455/456.1, 404.2, 457; 709/727
    See application file for complete search history.

(56) References Cited

U.S. PATENT DOCUMENTS 6,466,796 B1 * 10/2002 Jacobson et al. ........ 455/456.3

FOREIGN PATENT DOCUMENTS

| EP | 0 748 065 | 12/1996 |
|----|-----------|---------|
| EP | 0 785 535 | 7/1997 |
| JP | 06334703 A * | 2/1994 |
| JP | 9-257501 | 10/1997 |
| JP | 6-664703 | 12/1997 |
| JP | 10-162033 | 6/1998 |
| JP | 10162033 A * | 10/1998 |
| JP | 11-252121 | 9/1999 |
| JP | 11-282863 | 10/1999 |
| JP | 11282863 A * | 10/1999 |
| KR | 2001-0056715 | 7/2001 |
| WO | WO 00/67450 | 11/2000 |
| WO | WO 01/08339 | 2/2001 |
| WO | WO 01/19102 | 3/2001 |

OTHER PUBLICATIONS

Form PCT/IPEA/409 (International Preliminary Examination Report).
International Preliminary Examination Report including Forms PCT/IB/338 and PCT/IPEA/409 dated Apr. 28, 2004.
International Preliminary Examination Report including Forms PCT/IB/338 and PCT/IPEA/409 dated May 27, 2004.
Korean Office Action mailed on Sep. 28, 2006 in corresponding Korean patent application No. 10-2004-7000340.
Suplementary European Search Report for corresponding European Application No. 01947958.3-1244 dated Sep. 11, 2007.

* cited by examiner

*Primary Examiner*—Lester G. Kincaid
*Assistant Examiner*—Charles Shedrick
(74) *Attorney, Agent, or Firm*—Staas & Halsey LLP

(57) ABSTRACT

Corresponding to each notification system of position information different for each carrier and terminal, the position information about a user of an information terminal can be obtained, and a service can be provided according to position information without a service provider managing user position information. An information terminal user position information acquisition apparatus includes a terminal determination unit for determining the type of an information terminal depending on data transmitted from an information terminal of a user, and a position information extraction means for extracting the position information about the user from the data transmitted from the information terminal.

15 Claims, 20 Drawing Sheets

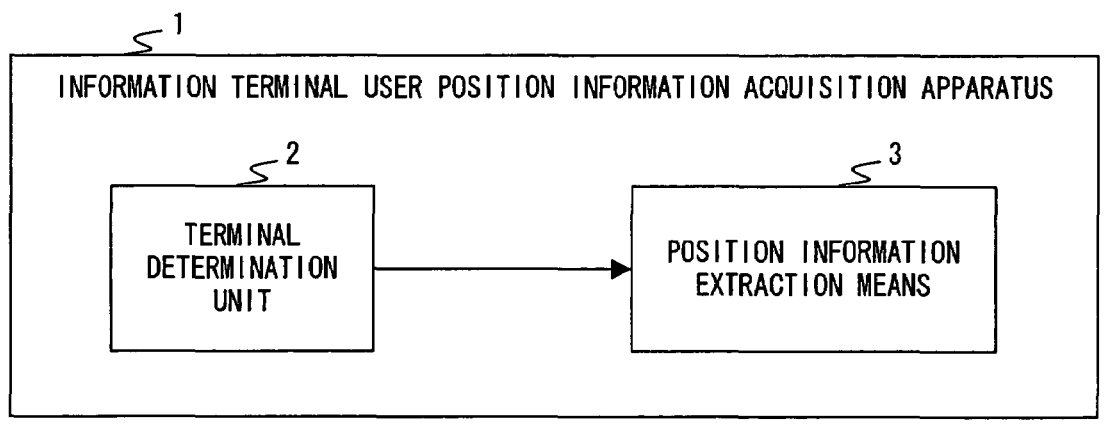
F I G. 1

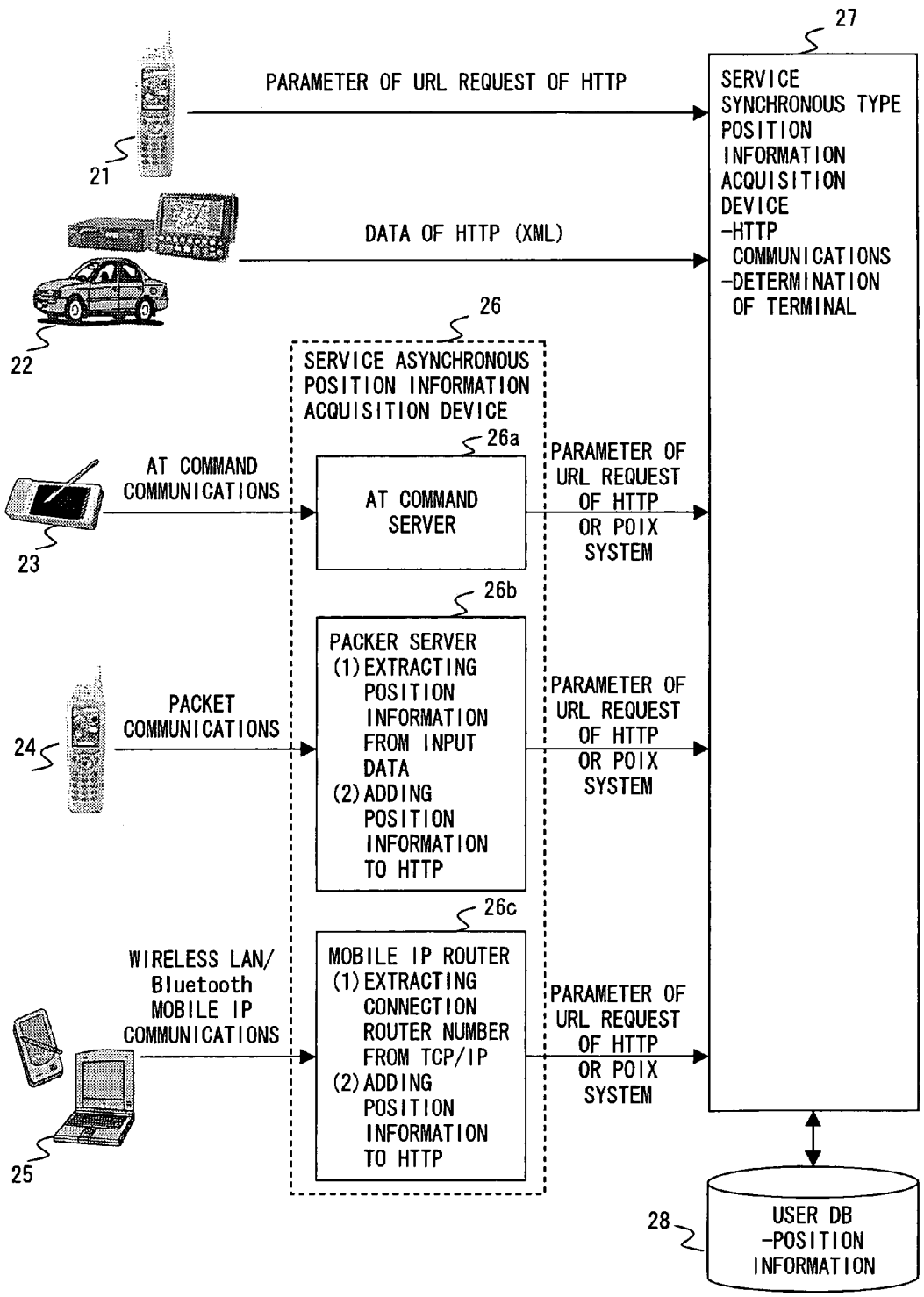
F I G. 3

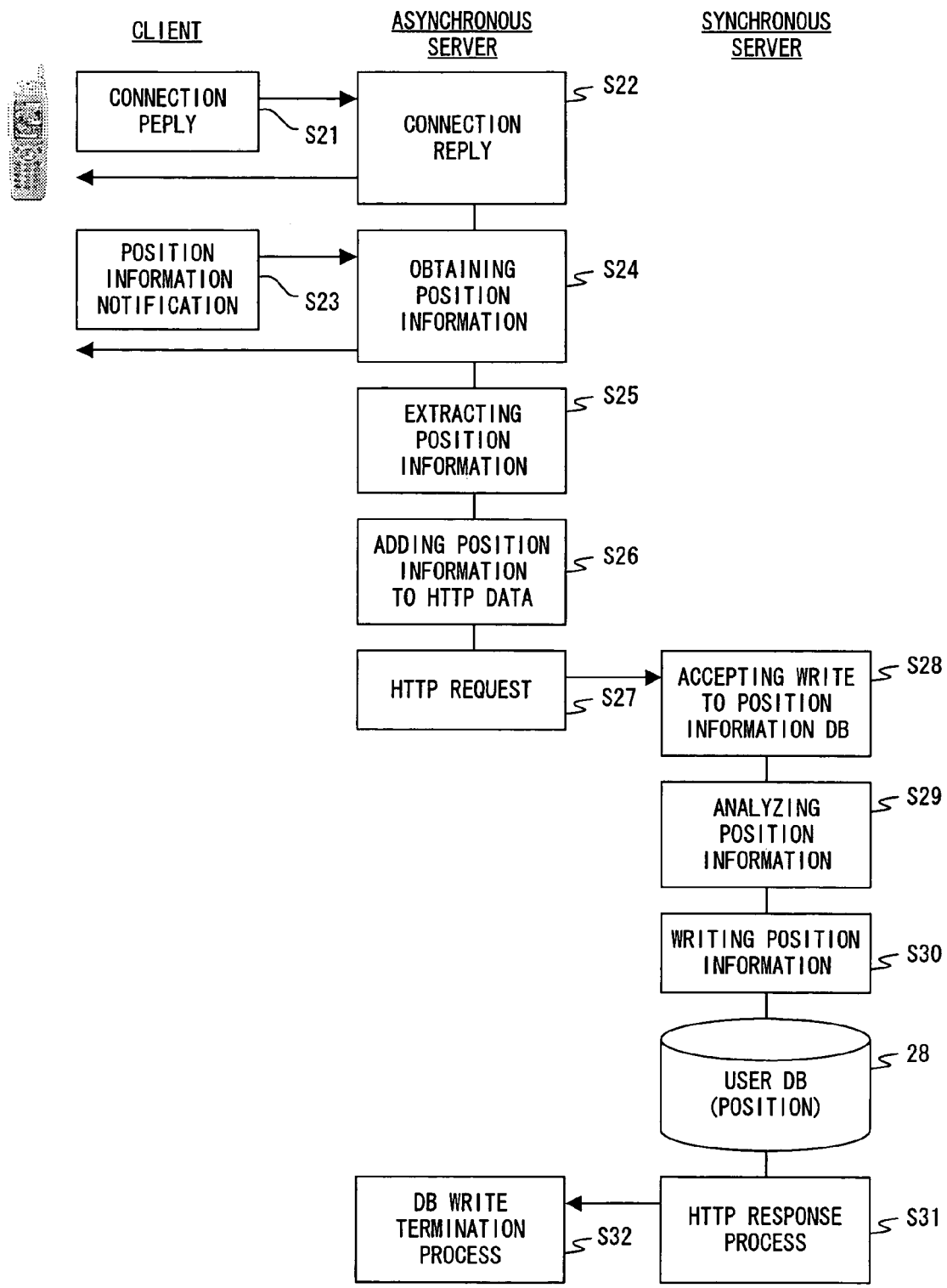
F I G. 7

| USER ID | MALE/FEMALE | AGE | HOBBY | TERMINAL ID | DATE | TIME | POSITION DISPLAY INFORMATION |
|---|---|---|---|---|---|---|---|

(b)

| GEODESIC SYSTEM | COORDINATE SYSTEM | LATITUDE | LONGITUDE |
|---|---|---|---|

(c)

| BASE STATION NUMBER |
|---|

(d)

| NEAREST STATION |
|---|

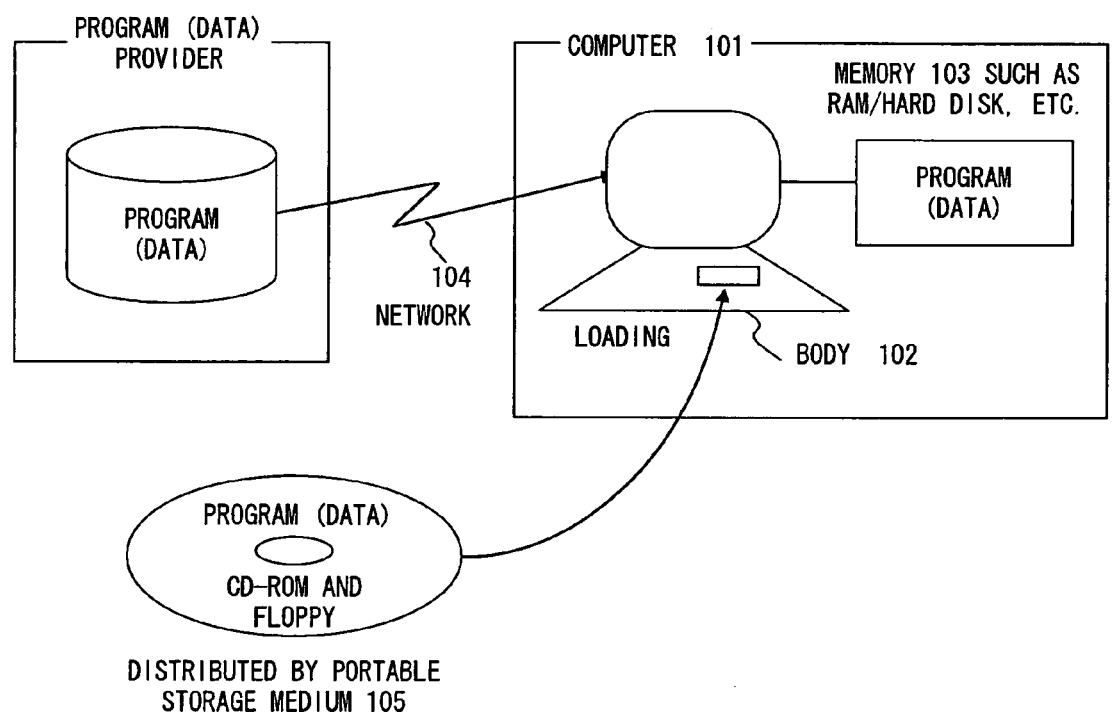
F I G. 19

POSITION INFORMATION ACQUISITION APPARATUS AND METHOD

CROSS REFERENCE TO RELATED APPLICATION

This application is a continuation of international PCT application No. PCT/JP01/05978 filed on Jul. 10, 2001.

BACKGROUND OF THE INVENTION

1. Field of the Invention

The present invention relates to a wide range of communications fields such as wireless communications, Internet communications, etc., and more specifically to a system capable of acquiring the position information about a user who uses various information terminals, and offering a service using the position information.

2. Description of the Related Art

With an increasing use of the Internet, etc. a number of information terminals connectable to the Internet such as a personal computer (PC), a mobile phone, a mobile PC, a PDA (personal digital assistant), an information terminal mounted in a car, etc. have been developed.

Furthermore, the extension of the scale of a wireless communications carrier, the diversification of communications technology such a local wireless communications as Bluetooth, etc. have rapidly proceeded, and users have become able to receive a service using the Internet not only in a fixed position at, for example, a PC, but also while moving.

Therefore, a service provider such as a wireless communications carrier, an Internet provider, etc. has generated a system for providing a user with a value-added service using position information.

FIG. 20 is a block diagram of the configuration of the system of the conventional technology for offering a service using the above-mentioned position information. In FIG. 20, the system comprises an information terminal 110, a program 111 of a service provider, a position service server 112 for regularly acquiring the position of the information terminal 110, and a program support function 113 for supporting the program 111.

The program 111 and the information terminal 110 are connected through a channel 114, and a service, for example, providing contents, etc. is offered through the channel.

The information terminal 110 is connected to an internal position service function 120 of the position service server 112. The program 111 is connected to the position service function 120 through the channel 116, and the program 111 can inquire of the position service function 120 about the position of the information terminal 110 through the channel.

The program 111 can also acquire by way of an interface 122 and a channel 118 the position information about the information terminal 110 transmitted through the channel 117 from the position service function 120 to a zone management function 121 of the program support function 113.

The following documents disclose the conventional technology of providing significant information for a mobile terminal and providing information about the position of a user.

Literature 1) Japanese Patent Application Laid-open No. 9-257501

General Guide System

Literature 2) Japanese Patent Application Laid-open No. 11-252121

Position Depending Information Providing System

Literature 1 discloses a navigation server of collecting significant information from various information providing server connected to a network and transmitting the information to a mobile terminal while moving.

Literature 2 discloses a system of providing appropriate information for a position of a visitor who moves around, for example, an exhibition hall.

However, in the systems disclosed by the documents and the conventional technology (FIG. 20), a system is limited to a communications system of a specific communications carrier, obtains position information only in a communications system of a specific carrier or a specific communications terminal, and the service provider cannot provide a service without the restrictions on a carrier or an information terminal.

In the system of a conventional technology, a service provider has to inquire about the position information about a user when a service is to be provided, which requires complicated management of position information of a user.

The present invention aims at providing a position information acquisition apparatus capable of obtaining position information about a user having an information terminal corresponding to various notification system of position information different for each carrier and terminal, and providing a system capable of providing a service according to position information without a service provider inquiring about the position information about a user each time a service is offered, and capable of performing an accounting process on an entry in a system of a user, and an accounting process on the communications between a service provider and a user according to position information.

SUMMARY OF THE INVENTION

An information terminal user position information acquisition apparatus I according to the present invention is an apparatus for acquiring position information about a user of plural types of information terminals different in position information communication system, and includes a terminal determination unit 2, and a position information extraction unit 3 as shown in a block diagram in FIG. 1 showing the principle of the present invention.

A terminal determination unit 2 determines the type of an information terminal depending on the data transmitted from an information terminal of a user. In response to the determination result, the position information extraction unit 3 extracts position information about a user from the data transmitted from the information terminal.

According to an embodiment of the present invention, the information terminal user position information acquisition apparatus can further include an accounting unit for performing an accounting process depending on an entry of a user in a system including the information terminal user position information acquisition apparatus.

According to an embodiment of the present invention, the terminal determination unit can determine the type of an information terminal depending on the data transmitted from an information terminal in the system of announcing position information when a service is requested to an external device.

The information terminal user position information acquisition apparatus can further include a communications system and/or data conversion unit for converting data transmitted from an information terminal in a system of regularly or irregularly announcing position information when a service is not requested to an external device into the same communications system and/or data format as the data from the information terminal in the system of announcing position information when the service is requested to the external device in plural types of information terminals, and the terminal determination unit can determine the type of a terminal using the converted communications system and/or data.

In this case, the information terminal user position information acquisition apparatus can further include: a user authentication unit for authenticating a user of a terminal which has announced position information using data from an information terminal of a system of announcing position information when a request is issued to an external device, or data converted by the communications system and/or data conversion unit; and a position information storage unit for storing position information extracted by a position information extraction unit together with terminal information corresponding to an authenticated user.

In this case, each time position information is announced from an information terminal of a user, the terminal determination unit can determine the type of information terminal, the position information extraction unit can extract position information, and the position information storage unit can store the latest position information and terminal information.

Furthermore, when a plurality of information terminals of a system for announcing position information when a service is requested simultaneously announce position information, the information terminal user position information acquisition apparatus can set as a system operation environment a policy of prioritizing position information from which information terminal, and the position information storage unit can store position information from an information terminal prioritized by the policy.

According to another embodiment of the present invention, the information terminal user position information acquisition apparatus can further include an application linking apparatus for link with an application of a service provider for providing a service for a user.

In this case, the application linking apparatus can further include: an event notification unit for receiving designation of a condition including an area from a service provider in advance, and notifying the application side of the data relating to the user when the user satisfies the designated condition; a position information reformat unit for receiving a request from a service provider, and reformatting position information about a user extracted by the position information extraction unit; and an accounting unit for performing an accounting process for a service provider on the communications established between a service provider and a user by a link with an application.

Furthermore, the information terminal user position information acquisition apparatus further includes the application linking apparatus in addition to the user authentication unit and the position information storage unit. The application linking apparatus can further comprise a position information retrieval unit for retrieving position information about specified user from the position information storage unit in accordance with a request from an application in a service provider, and notifying the application side of the information.

In the position information acquiring method according to the present invention, the type of an information terminal is determined by the data transmitted from an information terminal of a user, and the position information about the user is extracted from the data transmitted from the information terminal depending on the determination result.

A computer-readable portable storage medium storing a program used to direct a computer including a device for acquiring position information according to the present invention to perform: a step of determining the type of information terminal by the data transmitted from an information terminal of a user, and a step of extracting the position information about the user from the data transmitted from the information terminal depending on the determination result.

A program used by a computer configuring an apparatus for acquiring position information according to the present invention to enable the computer to perform: a procedure of determining the type of information terminal by the data transmitted from an information terminal of a user, and a procedure of extracting the position information about the user from the data transmitted from the information terminal depending on the determination result.

Furthermore, a system of managing and using the acquisition of a status and a position of a user in an information terminal according to the present invention includes: a service synchronous position information acquisition unit for acquiring position information about an information terminal according to a first communications protocol which announces position information when a user requests a service; and a service asynchronous position information acquisition unit for converting various communications protocol depending on the information terminal into the first communications protocol when the user requests a service, and transmitting the position information to the service synchronous position information acquisition unit according to the converted first communications protocol. The service synchronous position information acquisition unit uses an information terminal user position information acquisition management system including a position information management unit for managing the status and position information acquired according to the first communications protocol for each user, and an application link unit capable of retrieving service information according to the status and position information about a user from a user database and notifying a service provider of the information.

In the information terminal user position information acquisition management system, the service synchronous position information acquisition unit absorbs the difference in the technology of the information terminal and the carrier, and acquires the position information about a user.

BRIEF DESCRIPTION OF DRAWINGS

FIG. 1 is a block diagram of the configuration of the principle of the present invention;

FIG. 3 is an explanatory view of the system of inputting position information to the service synchronous position information acquisition device;

FIG. 7 is a flowchart of the process performed on the asynchronous position information in the case of client driven;

FIG. 9 is an explanatory view of an example of a data format of position information;

FIG. 19 is an explanatory view of loading a program to a computer for realization of the present invention.

DESCRIPTION OF THE PREFERRED EMBODIMENTS

Figure 2:
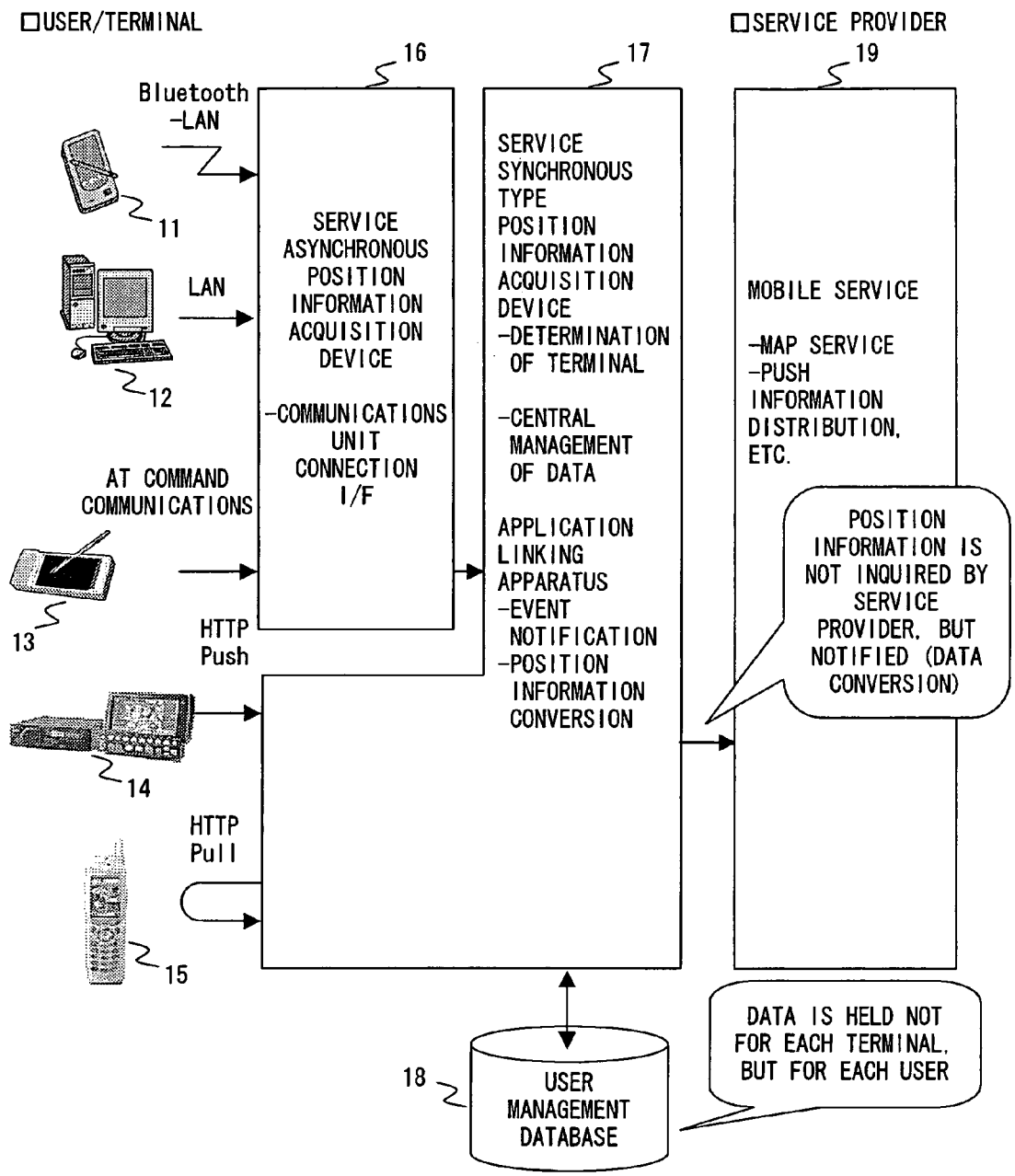
FIG. 2 is a block diagram of the system configuration including the position information acquisition apparatus according to the present embodiment.

FIG. 2 is a block diagram of the communications system configuration including the position information acquisition apparatus according to the present embodiment. In FIG. 2, an information terminal of a user can be of various types, and an embodiment of the present invention is described below as a system of two types, that is, a service synchronous type system and a service asynchronous type system, for the terminals announcing position information.

The service synchronous type system is a system for announcing position information when a user actually receives a service using an information terminal through the Internet, etc. from a service provider who offers various services. The service asynchronous type system is a system of regularly or irregularly announcing position information although a service is not requested as in the AT command communications using a modem.

In FIG. 2, a terminal 11 of a Bluetooth LAN, a personal computer 12 connected to a LAN, and a modem terminal 13 using an AT command provide position information of the service asynchronous type system for a service asynchronous position information acquisition device 16. The service asynchronous position information acquisition device 16 is assumed to obtain position information corresponding to various positioning systems without restrictions of an exclusive protocol of, for example, the HTTP communications, and is assumed to comprise a communications device and a connection interface to obtain the information.

A car navigation terminal 14, a PHS terminal 15, and a mobile phone terminal not shown in the attached drawings are to provide service synchronous type position information for an external device, and the position information is directly provided for a service synchronous type position information acquisition device 17 in the HTTP (hyper text transfer protocol) communications. The service synchronous type position information acquisition device 17 plays the most important role in the present embodiment, and centrally manages the position information from all terminals including the position information from a service asynchronous type position information transmission terminal obtained by the service asynchronous position information acquisition device 16.

The service synchronous type position information acquisition device 17 receives the output of the service asynchronous position information acquisition device 16 and the position information from a service synchronous type position information transmission terminal, determines a terminal such as the types of various terminals different in positioning system, stores terminal information and position information in a user management database 18, and centrally manages users, that is the position information about users. The user management database 18 stores position information for each user, not for each terminal.

The service synchronous type position information acquisition device 17 also functions as an application linking apparatus as described later, communicates position information in, for example, event communications for a mobile service 19 such as a map service, a push-type information distribution (for example, forcible information distribution at predetermined intervals), etc., and performs format conversion or reformat of position information at a request from the mobile service 19.

FIG. 3 is an explanatory view of the communications system of position information to the position information acquisition device from various terminals. In FIG. 3, position information is announced from various terminals 21 through 25 to a service asynchronous position information acquisition device 26 or a service synchronous type position information acquisition device 27.

For example, from the PHS terminal 21 or the mobile phone terminal not shown in the attached drawings, a URL request from the HTTP, for example, as a parameter of a request for a service with a URL (uniform resource locator) specified, or data (XML, extensible markup language) of the HTTP from the car navigation terminal 22, position information is announced to the service synchronous type position information acquisition device 27. When a service is to be received at a terminal, for example, during log-in, it is announced from a terminal.

For example, packet data is provided for the service asynchronous position information acquisition device 26 in the AT command format from a GPS terminal 23, etc. which uses the AT command communications, or in a format according to a protocol of packet communications from the packet data terminal 24, and position information corresponding to the communications system is provided from the mobile IP communications terminal 25 such as a wireless LAN, Bluetooth, etc. The position information from the AT command communications terminal 23 is converted into a parameter format of a URL request of the HTTP similar to the position information from the PHS terminal 21 by an AT command server 26a, and output to the service synchronous type position information acquisition device 27.

As for the position information from the packet data terminal 24, a packet server 26b first extracts position information from input data in (1), and the position information is added to the HTTP in (2), and is provided for the service synchronous type position information acquisition device 27 in a parameter format of a URL request of the HTTP.

For the data from the mobile IP communications terminal 25, a mobile IP router 26c extracts a connection router number from the TCP/IP (transmission control protocol/Internet protocol) in (1), and position information is added to the HTTP in (2), and is provided as a parameter of a URL request of the HTTP for the service synchronous type position information acquisition device 27.

Since the service synchronous type position information acquisition device 27 determines a terminal and analyzes position information, the difference in communications system including a carrier and a terminal can be absorbed, and the result is stored as position information in a user DB 28.

Figure 4:
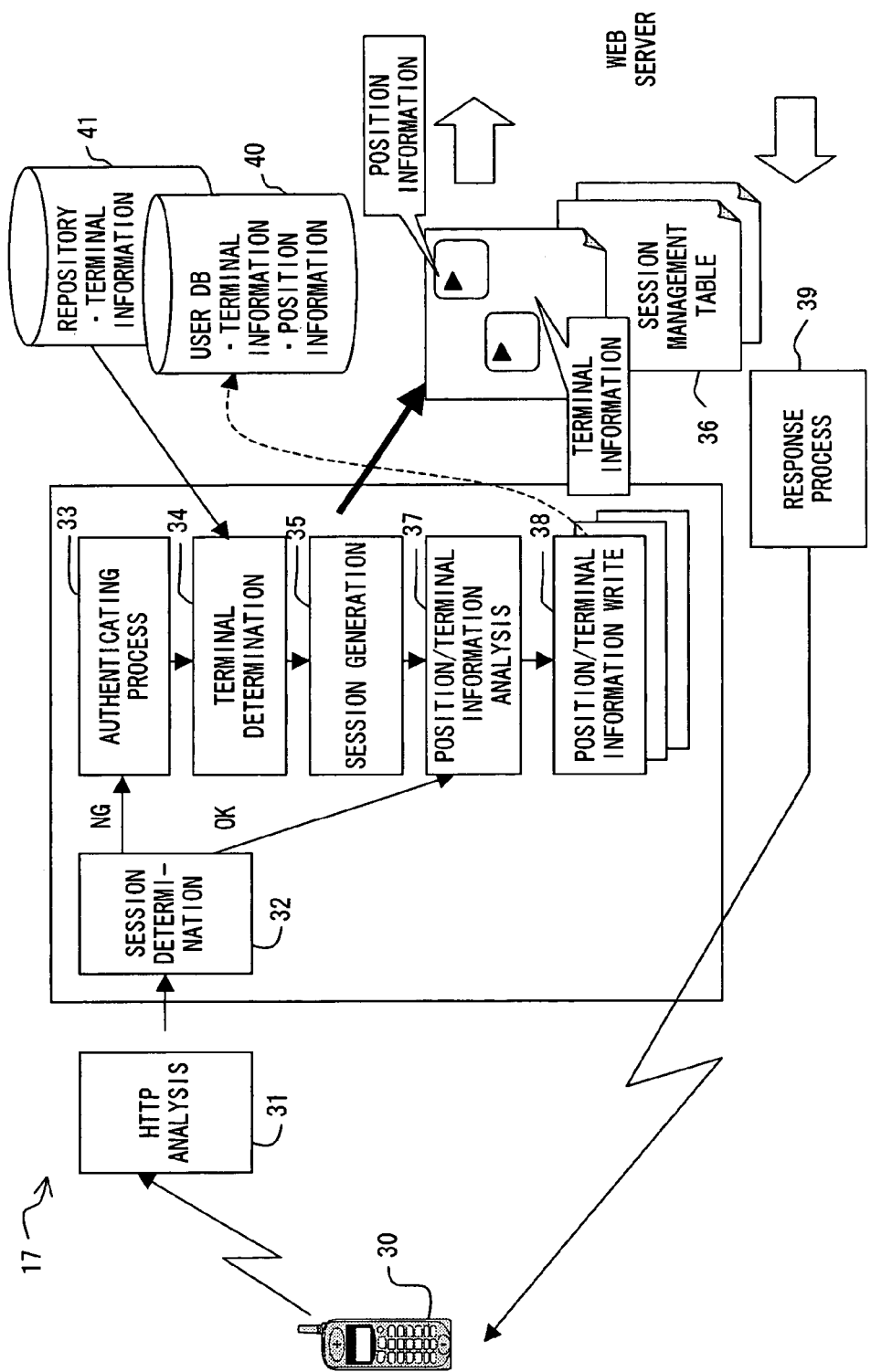
FIG. 4 is an entire explanatory view of the process performed by the service synchronous position information acquisition device.

FIG. 4 is the general explanatory view of the processing operation including session management performed by the service synchronous type position information acquisition device 17 shown in FIG. 2 i.e. the device 27 shown in FIG. 3. One session spans from the log-in of a series of communications to the log-out, for example, when a user is to receive a service through the Internet using an information terminal.

In FIG. 4, for example, when a service request is input to the service synchronous type position information acquisition device 17, an HTTP analysis 31 is first performed, and then a session determination 32 is made.

In the session determination 32, it is determined whether or not the system has logged in to a session in a series of communications for the service, that is, for example, an identifier of a session is assigned to the session, and the session management has been performed.

If the system has not logged in to the session, a user authenticating process is performed by retrieving a user ID from a user DB 40 in an authenticating process 33, and then a terminal is discriminated in a terminal determination 34 according to terminal information in a repository 41 storing the terminal information relating to various terminals.

After the user authentication and the terminal determination are performed respectively by the authenticating process 33 and the terminal determination 34, a session generation 35 is performed, and the data relating to the generated session is stored in a session management table 36.

After the session generation 35, or when it is determined according to the result of the session determination 32 that the session has been generated and managed, a position/terminal information analysis 37 is performed, and an analysis result is stored in the user DB 40 in the format of a pair of position information and terminal information by a position/terminal information write 38.

Then, necessary data for execution of a service requested by a user is transmitted to the Web server. In response to the data transmitted from the Web server, a response process 39 is performed, and the result is transmitted to the mobile terminal 30.

Figure 5:
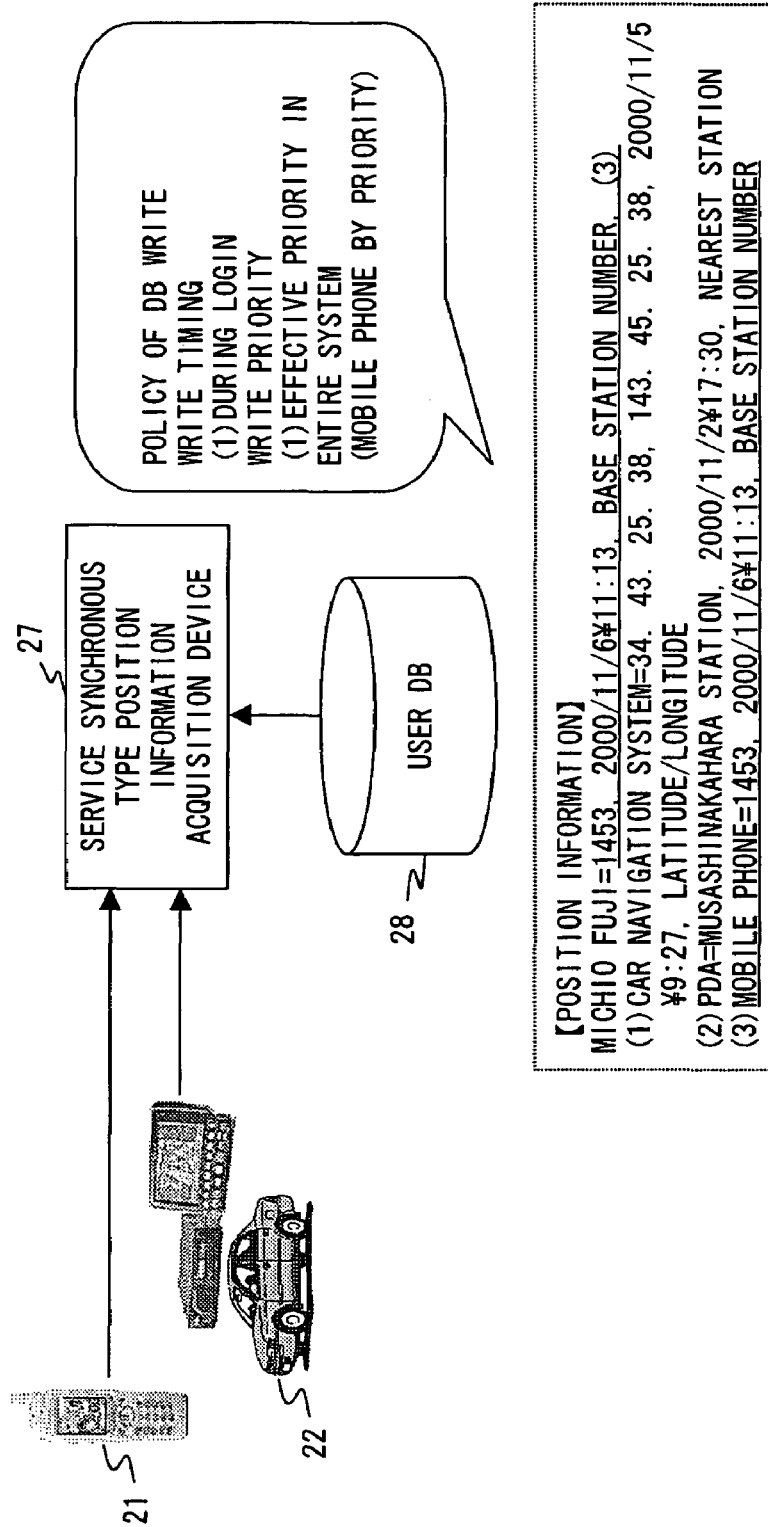
FIG. 5 is an explanatory view of the policy of writing position information to the database.

FIG. 5 is an explanatory view of the write policy when position information is written to a user database. According to the present embodiment, for the write policy of the position information to the user DB 28, a write timing and a write priority are set as a system operation environment.

Relating to the write timing, since the communications period and the system of position information are different depending on each carrier and terminal, the write timing is to be specified as, for example, (1) during login, (2) when a service is requested, and (3) during logout, etc. In the present embodiment, an initial value is set for login.

Relating to the writing priority, since there are a number of users having a plurality of mobile terminals, it is necessary for a system or a user to designate the priority when the position information form the mobile terminals of one user overlaps and simultaneously announced.

The priority designation system can be (1) determining a significant priority in the entire system, and (2) a significant priority is determined for each user. An initial value is the priority significant in the entire system.

FIG. 5 is an explanatory view of a write policy of position information when a user gets into a car, turns on the engine, and activates the service of the car navigation terminal 22 with the PHS terminal 21 connected to the service synchronous type position information acquisition device 27. In this example, as a write policy of the DB, as a write timing, (1) as a write priority during login, assuming that the priority of the mobile phone is specified as the significant priority in the entire system, as the position information about a user, the position information announced from the mobile phone of (3) is written to the user DB 28.

Figure 6:
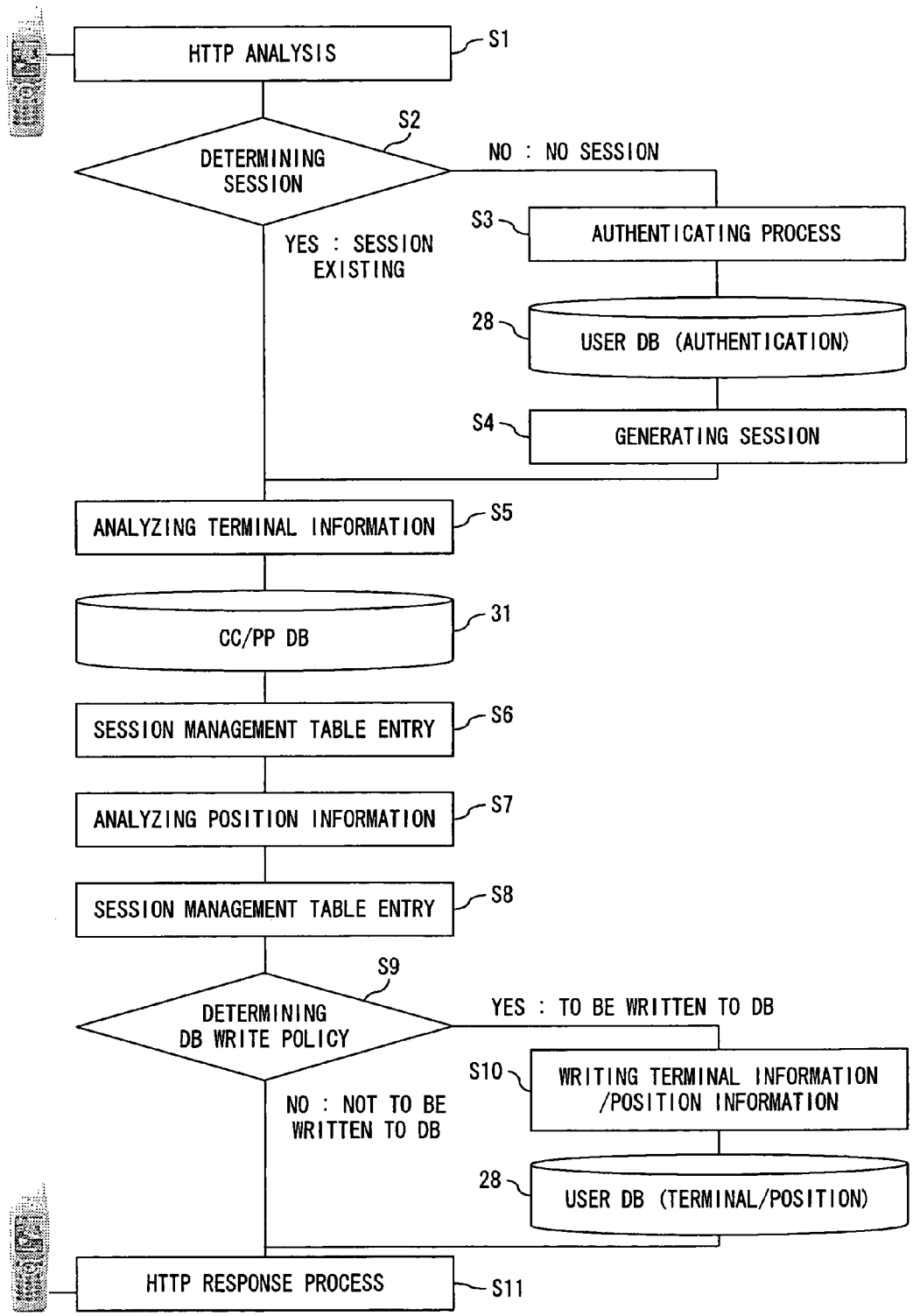
FIG. 6 is a flowchart of a process of writing data into a database.

FIG. 6 is a write process flowchart according to the DB write policy explained above by referring to FIG. 5. FIG. 6 is a flowchart of the DB write process when a plurality of terminals simultaneously announce position information directly to the service synchronous type position information acquisition device 27 shown in FIG. 3, for example, to request a service to a Web server.

In FIG. 5, when position information is transmitted from the PHS terminal 21, an HTTP analysis is performed in step S1 shown in FIG. 6 by analyzing session information from the parameter of the HTTP request information and terminal information and position information from the header. It is determined whether or not a session has been generated in step S2. If it has not been generated yet, then an authenticating process is performed for the user ID using the authentication data in the user DB 28 in step S3, and a session is generated in step S4.

If a session has already been generated or is newly generated, then terminal information is analyzed in step S5. It is assumed that the analysis is performed using the storage contents of the CC/PP database 31.

The CC/PP (composite capabilities/preference profile) represents capability of a terminal and the liking of a user in the format of the RDF (resource description framework) which a type of XML. In step S5, the terminal information obtained from the database 31 storing the CC/PP data is added to the terminal information analyzed by the HTTP analysis in step S1, and the terminal information is recorded in the session management table in step S6.

Then, the position information is analyzed in step S7, and the result is recorded in the session management table in step S8.

In step S9, a policy determination is made as to whether or not the position information recorded in the session management table is to be written in the database. Since the write policy explained by referring to FIG. 5 is set as a system operation environment, it is determined from the set contents whether or not the position information recorded in step S8 is to be written to the database. If it is determined that the position information is to be written, then the position information and the terminal information are written to the user DB 28 in step S10. If it is determined that the information is not to be written, the HTTP response process is immediately performed in step S11. In this response process, a session ID is added and the process of contents conversion, etc. is performed, and then necessary data for the terminal is output.

Figure 8:
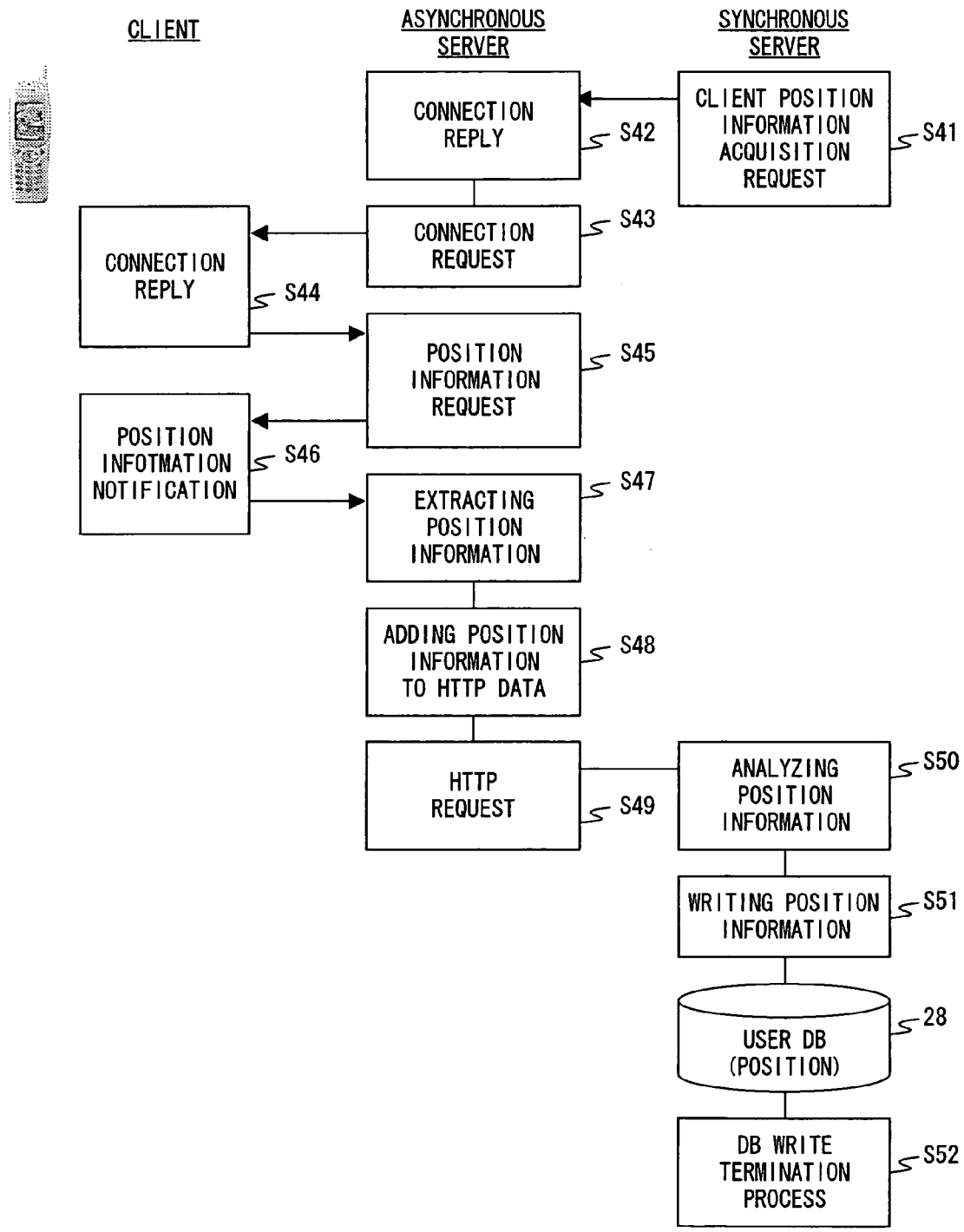
FIG. 8 is a flowchart of the process performed on the asynchronous position information in the case of server driven.

FIGS. 7 and 8 are flowcharts of the process performed on the service asynchronous type position information. The process flow for the service asynchronous type position information corresponds to the process according to the position information obtained using a communications unit other than the HTTP communications with the position information added or the position information regularly announced from the client as a terminal independent of the HTTP communications as, for example, a service request to the server as the position information acquisition apparatus, or inversely the process when the server notifies the terminal of the position information at a request from the service provider.

For example, for the communications system such as mobile IP communications which have not been practically implemented as a product although they are globally standard specifications, some systems can be assumed as a notification system of position information In the mobile IP, a protocol capable of routing a datagram addressed to a mobile node is prescribed without changing the home IP address for the mobile node in the Internet.

In a first notification system of the position information, an IP address of a router (foreign agent, FA) for changing a connection point from a network to another network to which the mobile node (MN) as a router is currently connected is added to the HTTP data for notification to a server. In a second system, a router (home agent/foreign agent, HA/FA) notifies a server of an IP address of a router currently connected to a client after the IP address is added to the HTTP data. In a third system, a server requests a router (HA/FA) for an IP address of the router to which a specified client is currently connected.

FIG. 7 is a process flowchart of the asynchronous position information corresponding to client driven. FIG. 7 shows the case in which position information can be obtained only by a communications unit other than the HTTP to which the above-mentioned position information is added, or the case in which server is regularly notified of position information from, for example, a terminal independent on the HTTP communications.

In FIG. 7, first, the client (terminal) issues a connection request to a asynchronous server, that is, the service asynchronous position information acquisition device 26 in step S21, and the asynchronous server returns a connection reply to the terminal in step S22. In response to this, the client issues a position information notification in step S23, and the asynchronous server obtains position information in step S24.

In step S22, the asynchronous server authenticates the client, and returns a connection reply to the client when there is no problem with the connection. The position information notification from the client in step S23 is issued according to the unique communications protocol and the communications system of the mobile IP communications. In step S24, a normal completion message is issued to the client by the asynchronous server determining that it has correctly obtained the position information.

The asynchronous server extracts the position information in step S25. In this example, position information is extracted from the header of the data obtained corresponding to various communications systems. Then, in step S26, position information is added to the HTTP data. The position information added here is assumed to be generated in, for example, the POIX language. In another example, the position information is added to the parameter of the request of the HTTP.

The POIX (point of interest exchange language) is a position information description language generated to exchange the information relating to the position through the Internet. It is designed using the XML (extensible markup language), not only simply represents a position, but also inclusively represents various information in addition to the position.

Then, in step S27, the asynchronous server transmits an HTTP request for a write to position information database to the synchronous server, that is, the service synchronous type position information acquisition device 27.

The synchronous server accepts a write request to the position information database in step S28. In step S29, the position information is analyzed. In this step, the position information is analyzed from the HTTP header. It is assumed that the terminal information has already been discriminated and determined. When there is only one terminal connected to the asynchronous server, the discrimination is not required.

The synchronous server performs the process of writing the position information as an analysis result together with the terminal information to the user DB 28 in step S30. The writing process is performed by the program different from the process flow explained by referring to FIG. 6. It is not necessary to generate a session for the service asynchronous type position information, or to record the information in the session management table. Additionally, no determination on the DB write policy is required, but the DB writing process is performed each time a notification about the position information is received.

Then, the synchronous server notifies the asynchronous server as an HTTP response process that the write to the user DB 28 has been normally completed. In response to the notification, the asynchronous server performs the DB write completion process by, for example, releasing the extraction result of the position information in step S32, thereby terminating the process. If the write of the position information at the synchronous server has failed, the HTTP request in step S27 is to be transmitted again to the synchronous server.

FIG. 8 is a process flowchart for the service asynchronous type position information in notifying the client of the position information by a server driven, for example, from the synchronous server in response to a request from the service provider.

In FIG. 8, the synchronous server transmits a request for the position information about the client to the asynchronous server in the HTTP in step S41. The asynchronous server accepts the request in step S42, and requests for a connection to the client, that is, the terminal in step S43.

The client authenticates the asynchronous server in step S44, and returns a connection reply to the asynchronous server if there is no problem. The asynchronous server requests position information in step S45. In response to the request, the client notifies the asynchronous server of the position information in the method according to the communications system of the unique communications protocol and the mobile IP communications in step S46.

In steps S47 and S48, the asynchronous server performs the processes similar to those in steps S25 and S26 shown in FIG. 7. In step S49, the asynchronous server notifies the synchronous server that the position information has normally been obtained as an HTTP response process.

In steps S50 and S51, the synchronous server performs the process similar to those in steps S29 and S30 shown in FIG. 7, and writes the position information and the terminal information to the user DB 28. In step S52, it releases the analysis result of the position information as the DB write completion process, thereby terminating the process. The write to the DB is performed without determining the write policy as in step S30 shown in FIG. 5.

FIG. 9 shows an example of a data format of the position information stored in the user DB. As described above, the position information is stored for each user according to the present embodiment.

In FIG. 9(a), a user ID, male or female, age, hobby, terminal ID, acquisition date of position information, and actual position display information are stored as position information.

There are some formats as position display information formats. FIG. 9 shows examples of the formats from (b) through (d). (b) indicates, for example, the position information corresponding to a base station of a mobile phone, and stores a geodesic system, a coordinate system, the latitude, and the longitude are stored as the position information about the base station closest to the user when the position information is received from the user.

The geodesic system is a type of coordinate system in the positioning system, and stores the type of geodesic coordinate system determined by the coordinate system, the Japanese standard geodesic system, and the space geodesic technology calculated by, for example, the GPS measurement. The coordinate system is a unit of the available coordinate system. For example, the discrimination of a degree unit or a degree/min/sec unit is stored.

(c) is a base station number stored as position display information instead of the position display information indicating the actual position of the base station. (d) is the closest station as the nearest station from the point announced as the position information by the base station or the user of the terminal. The position display information (b) through (d) can be switchable with each other.

FIGS. 10 through 13 are explanatory views of examples of using terminal information according to the present embodiment. These figures show examples of the processes performed at the Web server as shown in, for example, FIG. 4.

Figure 10:
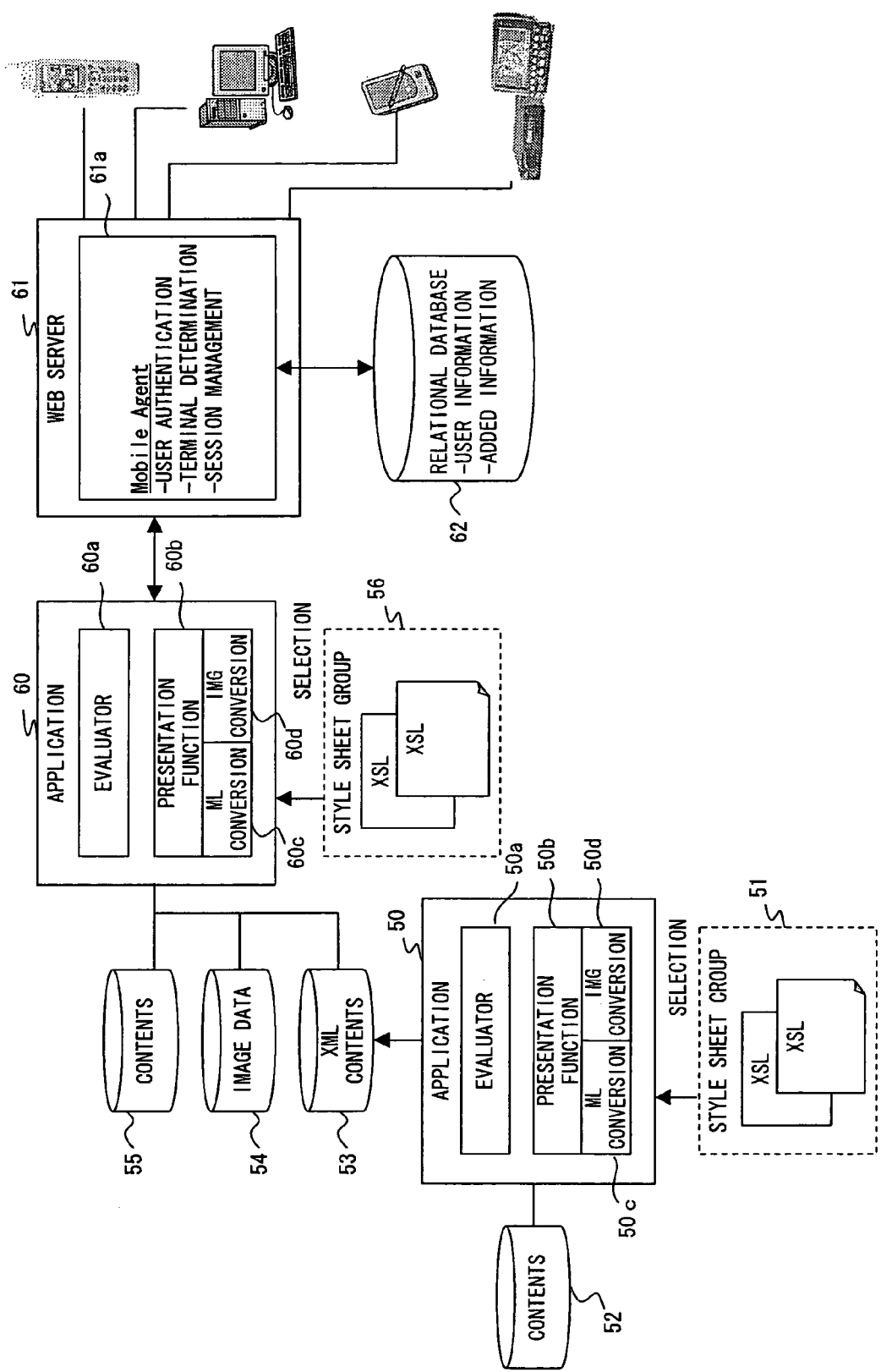
FIG. 10 is an entire explanatory view of contents conversion.

FIG. 10 is an explanatory view of the entire process of contents conversion as an example of a process according to the terminal information. In FIG. 10, for example, an application 50 selects a style sheet from a style sheet group 51 of an XML style sheet language (XSL), and generates an XML contents 53 using contents 55.

The application 50 contains an evaluator 50a and a presentation function 50b. The evaluator 50a determines a service system or method by matching, for example, the terminal capability with the service capability as described later.

The presentation function 50b comprises an ML conversion 50c and an IMG conversion 50d. The ML conversion 50c converts a contents file of a description language (markup language) such as an HTML, and the IMG conversion 50d converts the image data of a bit map, a graphic interchange format (GIF), etc. By the above-mentioned conversion, the presentation function 50b generates XML contents, etc. and externally provides the results.

Like the application 50, an application 60 comprises an evaluator 60a and a presentation function 60b (including an ML conversion 60c and an IMG conversion 60d), performs contents conversion by selecting a style sheet from a style sheet group 56 using the XML contents 53, image data 54, the contents 55, etc., and provides the result for a Web server 61.

In the contents conversion, a mobile agent 61a in the Web server 61 performs user authentication, terminal discrimination, session management, etc., and provides the terminal discrimination result as terminal information for the application 60. Furthermore, the Web server 61 uses as necessary the user information and added information in a relational database 62.

Figure 11:
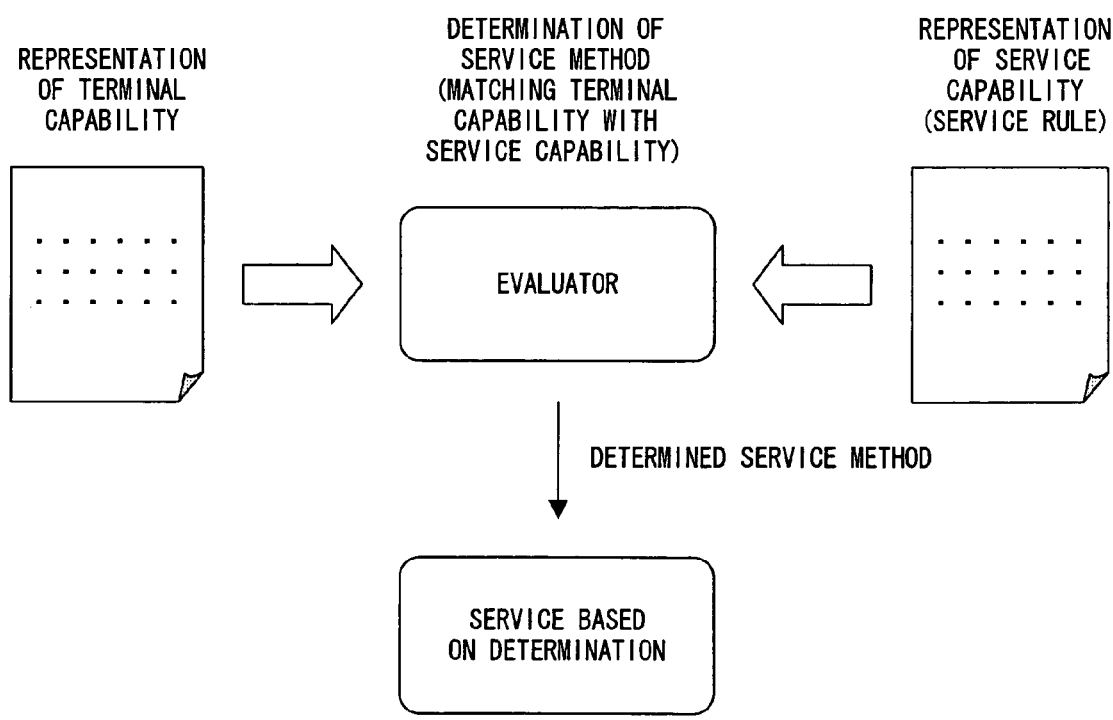
FIG. 11 is an explanatory view of the process by an evaluator.

FIG. 11 is an explanatory view of the operation of an evaluator. The evaluator matches the terminal capability with the service capability using the representation of the terminal capability and the representation of the service capability (service rule), determines a service method, outputs the determined service method, and offers a service based on the determination.

Figure 12:
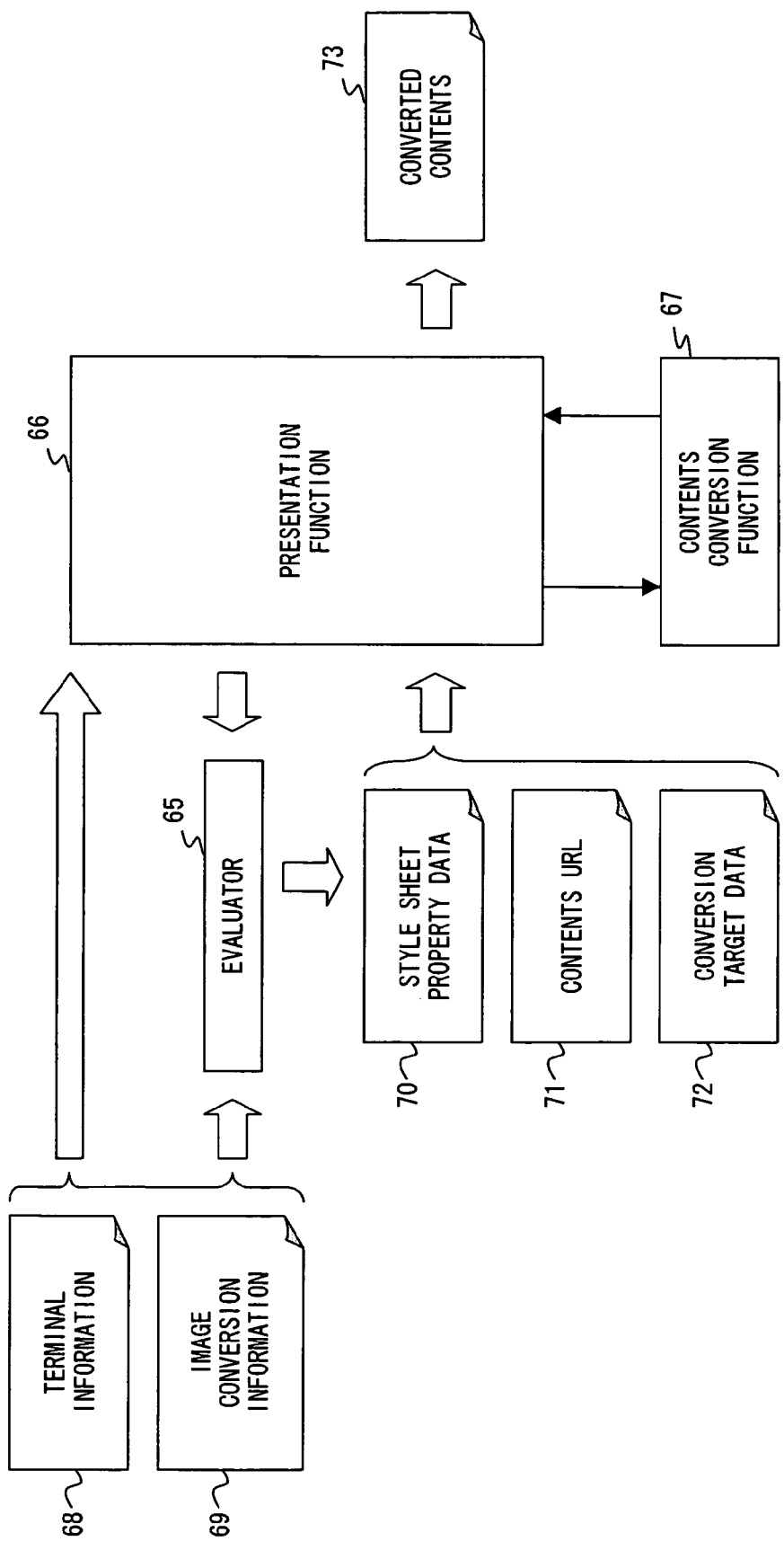
FIG. 12 is an explanatory view of the process of contents conversion.

FIG. 12 is an explanatory view of the process of contents conversion. In FIG. 12, terminal information 68 obtained by terminal discrimination, selection information about the XSL, and image conversion information 69 are provided for an evaluator 65 and a presentation function 66.

For example, the information that the description language displayed on the terminal as the terminal information 68 is C-HTML is transmitted to the evaluator 65, and the evaluator 65 refers to the contents requested from the terminal from the contents database. If the description is the HTML, then the presentation function 66 is instructed to convert the HTML into C-HTML.

The presentation function 66 requests a contents conversion function 67 to convert the contents in response to the input of style sheet property data 70, a contents URL 71, and conversion target data 72, and outputs converted contents 73.

In the above-mentioned contents conversion, a description language is converted among the HTML (hyper text markup language), C-HTML, MML (mobile markup language), HDML (hand-held device markup language), WML (wireless markup language), the above-mentioned POIX, etc. as the conversion of a description language.

As for the conversion of image data, image data is converted among the formats such as GIF (graphic interchange format), JPEG (joint photographic expert group), BMP (bit map), and TIFF (tag image file format), etc.

Figure 13:
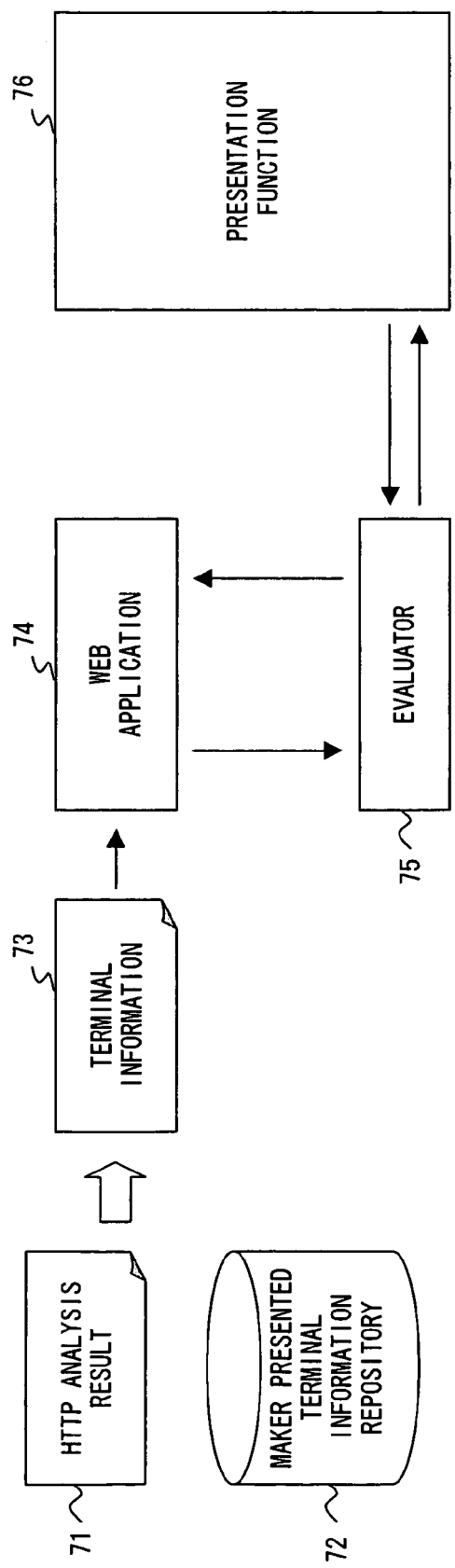
FIG. 13 is an explanatory view of a terminal determining process.

FIG. 13 is an explanatory view of the terminal discrimination process. Terminal information 73 is generated using the result 71 of the HTTP analysis explained by referring to step S1 shown in FIG. 6, and the contents of the repository 72 of the terminal information provided by the maker. The terminal information 73 is transmitted to a Web application 74 as the header of the HTTP request in the CC/PP format from the mobile agent 61a shown in FIG. 10.

The Web application 74 calls an evaluator 75, the evaluator 75 instructs a presentation function 76 to, for example, perform contents conversion, etc. according to the terminal information.

Figure 14:
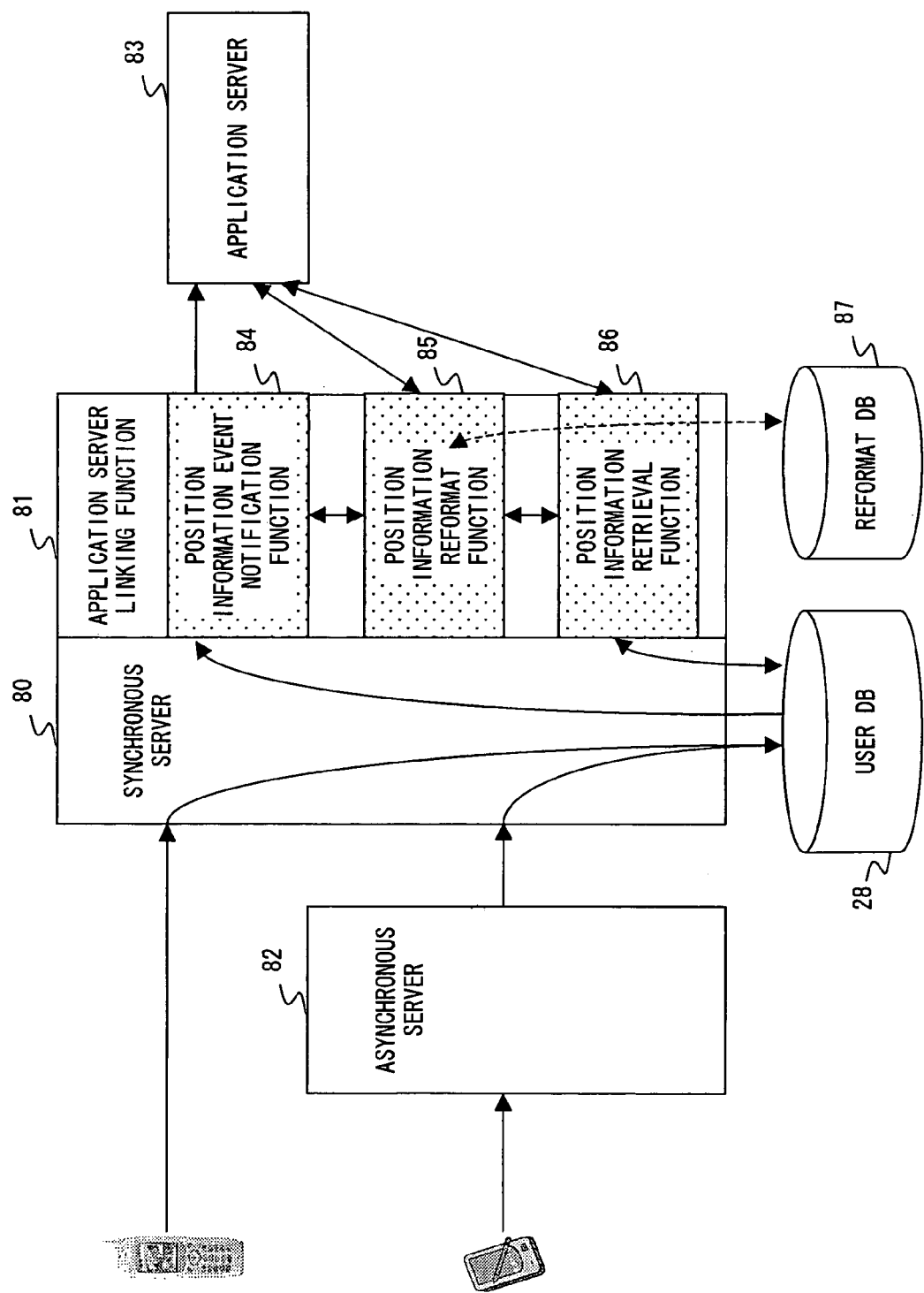
FIG. 14 is an explanatory view of three functions provided by an application server linking function.

FIG. 14 is an explanatory view of the application server linking function. An application server linking function 81 closely cooperates with a synchronous server 80, and realizes the linking function with an application server 83.

The application server linking function 81 provides a position information event notification function 84, a position information reformat function 85, and a position information retrieval function 86 using stored contents of the user DB 28 and a reformat DB 87 according to the service synchronous type position information received from the PHS terminal to the synchronous server 80, or the service asynchronous type position information received from, for example, a mobile IP communications terminal through an asynchronous server 82.

Figure 15:
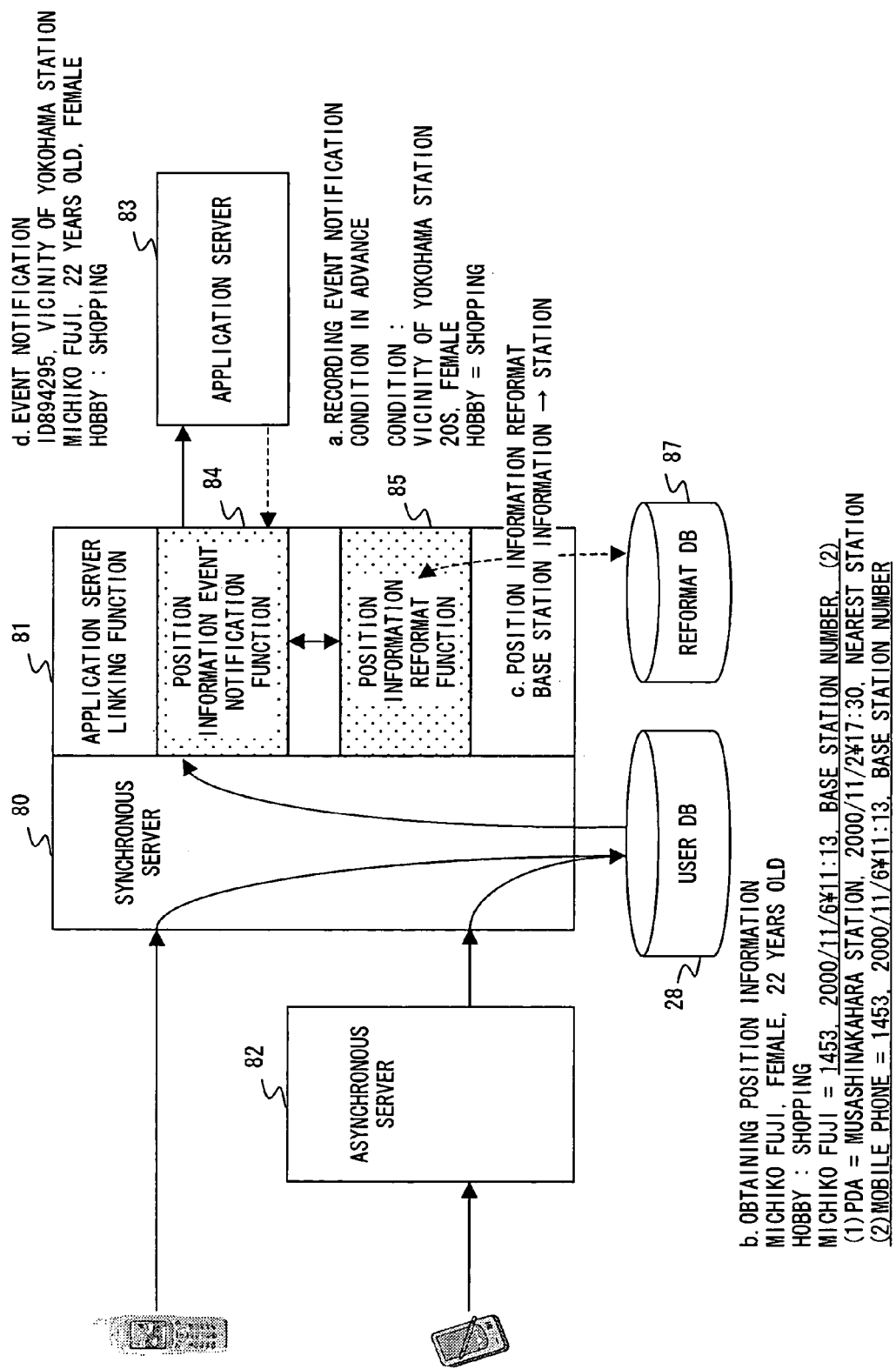
FIG. 15 is an explanatory view of a position information event notification by an application server linking function.

FIG. 15 is an explanatory view of the position information event notification function 84 provided by the application server linking function 81. The position information event notification function 84 is a function of automatically issuing an event notification to the application server 83 when the position information satisfying the recorded condition for reception of an event notification in advance from the application server 83 is obtained.

As the condition, the personal information, etc. such as the hobby of a user can be flexibly added in addition to the position information depending on the contents of a service. To the event notification data, not only a user ID, but also personal information such as a hobby of a user, etc. can be added. It is also converted into a format for an event notification.

In a. shown in FIG. 15, the application server 83 records "vicinity of Yokohama Station", "female of 20 years old", and "hobby of shopping" as an event notification condition. In b. the position information corresponding to the condition is obtained. As the position information, the position information from the mobile phone of (2) is stored in the user DB 28. For the stored position information, the base station information is converted into the nearest station as the reformat of the position information in c., and an event notification is provided for the application server 83 according to the reformatted position information in d.

Figure 16:
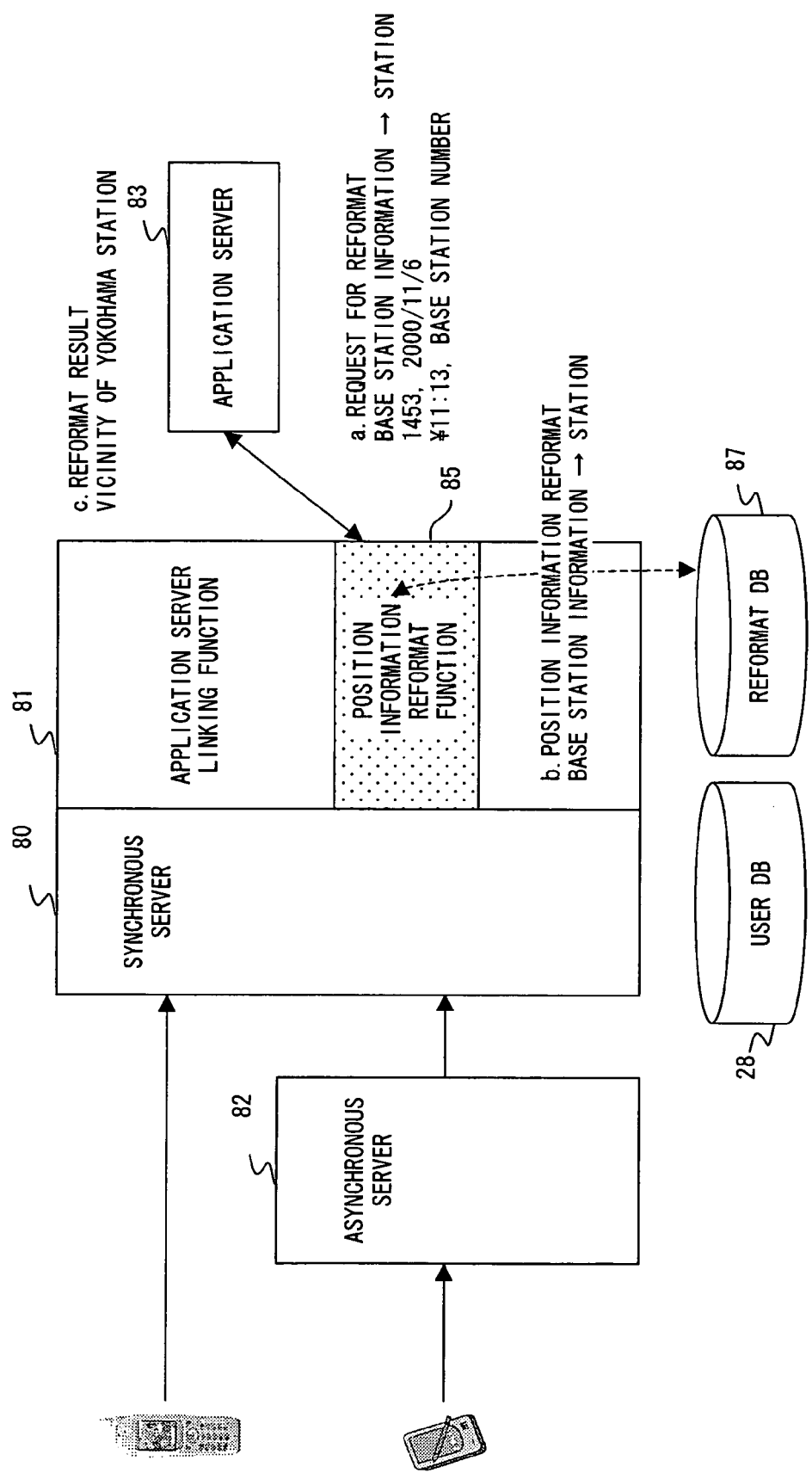
FIG. 16 is an explanatory view of position information format conversion by the application server linking function.

FIG. 16 is an explanatory view of the operation of the position information reformat function. In this function, for example, when the application server 83 requires the reformat of the already obtained position information for the convenience of a service, the reformat can be performed by transmitting position information to and from the application server linking function 81.

In FIG. 16, the application server 83 provides a request for conversion of base station information into the nearest station for the position information reformat function 85 in a. as the reformat of the position information. The position information reformat function 85 converts the format of the position information in b., and provides the application server 83 with the position information about "vicinity of Yokohama Station" as the nearest station for the base station number as a reformat result.

Figure 17:
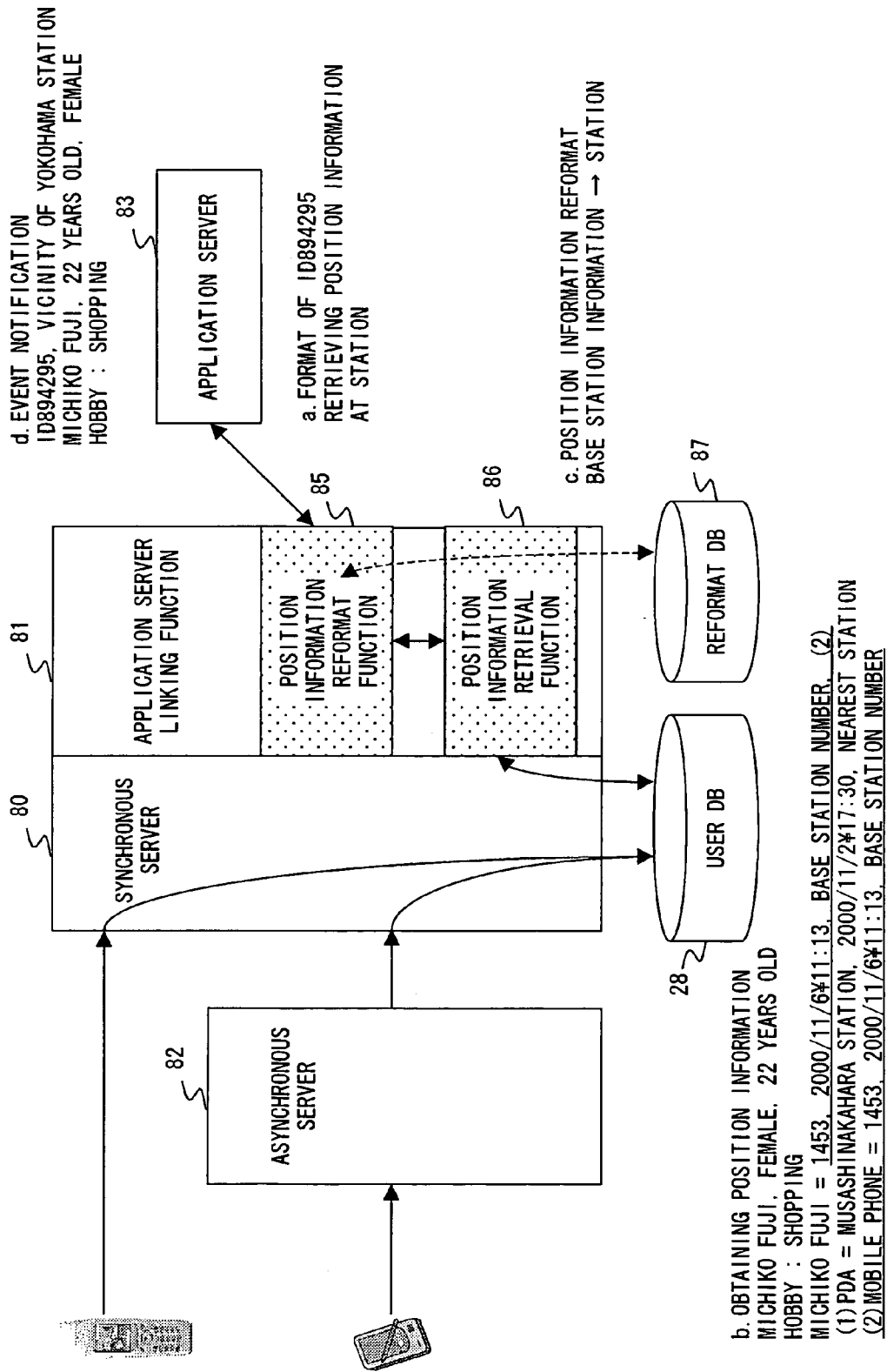
FIG. 17 is an explanatory view of the position information retrieving process by the application server linking function.

FIG. 17 is an explanatory view of the operation of the position information retrieval function 86. Using the function, when the application server 83 requests the current position information of a specific user, it requests the application server linking function 81 to retrieve the position information, thereby obtaining the position information of the user. In this case, the reformat of the position information can be automatically performed as necessary.

In a. shown in FIG. 17, the application server 83 specifies a user ID of a user, that is, ID894295, designates the nearest station as the format of the position information, and requests the retrieval of the position information to the application server linking function 81. The position information retrieval function 86 searches the user DB 28 for the position information of the user in b., but the format of the position information is the format of the base station number as the format of the position information about the mobile phone of (2). Therefore, the position information reformat function 85 converts the format of the position information from the base station information into the format of the nearest station in c., and the conversion result is announced to the application server 83 in d.

Figure 18:
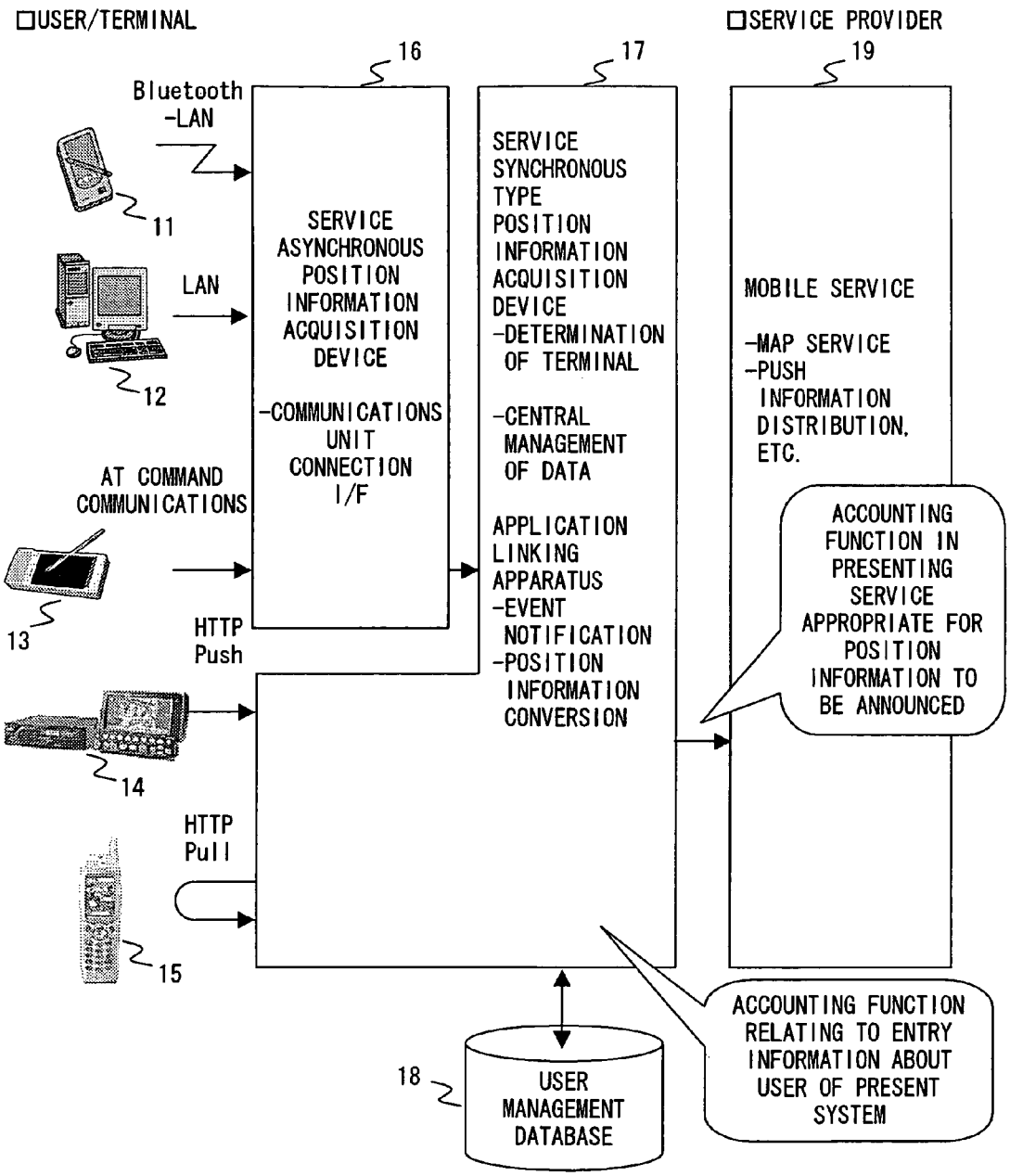
FIG. 18 is an explanatory view of the accounting function for the user and service provider of the system according to an embodiment of the present invention.
Figure 20:
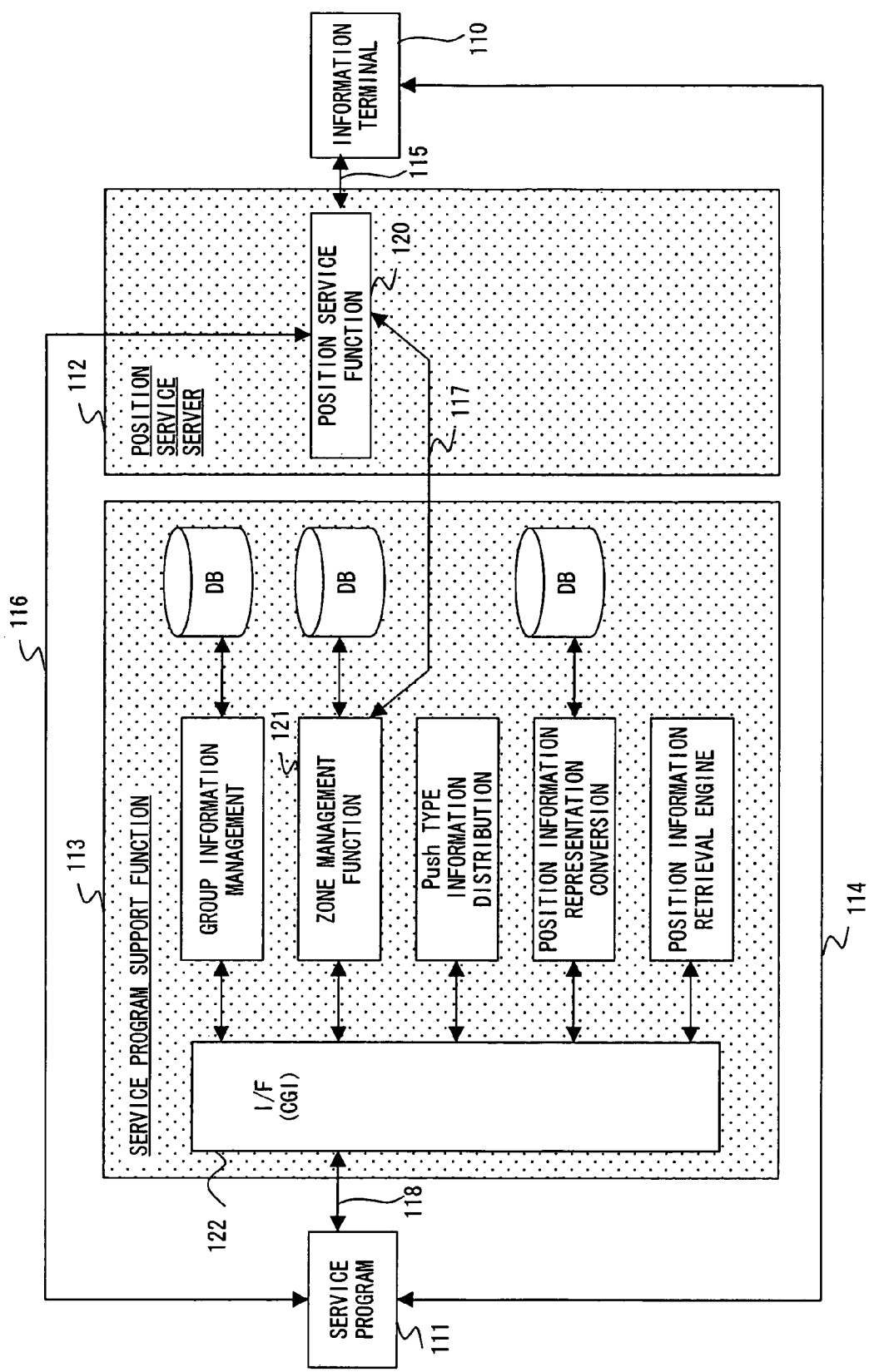
FIG. 20 is a block diagram of the conventional configuration of a position information use system.

FIG. 18 is an explanatory view of the accounting function for the system user, that is, a communications terminal owner, and the accounting function for the service provider by the service synchronous position information acquisition apparatus. The system user makes an entry in the system to freely receive various services from a number of service providers, and also can receive push-type information distribution in response to an event notification from the service synchronous position information acquisition apparatus to the application server, thereby acquiring a large merit.

Thus, for example, to regularly collect a rate from a user, a list of users recorded in the user management database 18 is output as an accounting log, and the system manager charges a user based on the accounting log.

Furthermore, to charge the service provider who can provide a user with a service by being notified of the position information about the user, an accounting log based on the provided contents is output at a request of the system manager, and the system manager charges the service provider based on the accounting log, that is, collects an advertising fee.

The application server linking function explained above by referring to FIGS. 14 through 17 is basically used for cooperation with an application server other than a synchronous server. However, when a synchronous server and an application server can be incorporated into a Web server, the application server is called by the synchronous server directly at an HTTP request.

When terminal information and position information are transmitted to the application server to perform the above-mentioned accounting process, the contents recorded in the session management table in steps S6 and S8 shown in FIG. 6 are added to the HTTP data, and the application server is called directly by an HTTP request. The terminal information is transmitted in the above-mentioned CC/PP format, the position information is transmitted in the POIX system, of a parameter of the HTTP request.

The position information acquisition apparatus according to the present embodiment, for example, the synchronous server 80, the asynchronous server 82, etc. shown in FIG. 14 are provided with a computer as the most important element. FIG. 19 is a block diagram of the configuration of the computer system.

In FIG. 19, a computer 101 is formed by a body 102 and memory 103. The memory 103 can be various types of storage devices such as random access memory (RAM), a hard disk, a magnetic disk, etc., and the memory 103 stores a program shown in the flowcharts in FIGS. 6 through 8, and a program according to claims 14 and 15 of the present invention. The program can be executed by the body 102 so that position information can be obtained, centrally managed, and linked with an application.

The program can be loaded to the computer 101 through a network 104, or can be stored in a marketed and distributed portable storage medium 105 and loaded to the computer 101 for execution. The portable storage medium 105 can be of various types such as CD-ROM, a floppy disk, an optical disk, a magneto-optic disk, etc. The above-mentioned storage media is set in the computer 101, and the position information about users of plural types of terminals different in system of transmitting position information can be obtained.

As described above in detail, the position information about plural types of information terminals different in system of transmitting position information, especially the position information about the users of the information terminals of transmitting position information when a user requests a service and the information terminals of regularly or irregularly transmitting position information although a user does not request a service can be obtained. Although the position information from a plurality of information terminals of the same user is transmitted in an overlapping manner, the latest position information about the user is stored in a database and used by writing the position information from the terminal of the highest order according to the write policy of the position information in the database.

The present invention enables the latest position information about a user to be obtained, and the present invention can be applied to any industry in which the position information can be effectively used. The industrial applicability of the present invention is very wide, and can be highly evaluated by, for example, a carrier, an estate agent, a bus and taxi companies, etc.

What is claimed is:

1. An apparatus which acquires position information about a user of plural types of information terminals, comprising:
   a service-asynchronous position information acquisition unit receiving data including position information from service-asynchronous information terminals that announce position information independent of requesting a service and that support plural types of different communications protocol and/or data format; and
   a service-synchronous position information acquisition unit receiving data including position information from service-synchronous information terminals that announce position information when requesting a service and that support plural types of different communications protocol and/or data format;
   wherein said service-asynchronous position information acquisition unit comprises a conversion unit converting the received data to the same format as data received by the service-synchronous position information acquisition unit;
   said service-synchronous position information acquisition unit further receives data converted by said conversion unit of said service-asynchronous position information acquisition unit; said service-asynchronous information terminals and said service-synchronous information terminals receiving services from across multiple service providers; and
   said service-synchronous position information acquisition unit comprises:
   a terminal determination unit determining a type of the information terminal depending on data transmitted from the information terminal of the user according to which a communications protocol and/or data format is employed for the data transmitted from the information terminal, and
   a position information extraction unit extracting position information about the user from the data transmitted from the information terminal in response to the determination result, where a service of the service providers is provided to the plural types of information terminals based on the acquired position information received by the service-synchronous position information acquisition unit.

2. The apparatus according to claim 1, further comprising an accounting unit performing a process for charging a fee depending on an entry of a user to a system including the apparatus.

3. The apparatus according to claim 1, further comprising:
   a user authentication unit authenticating a user of a terminal which has announced position information using data from a service-synchronous information terminal, or data converted by the conversion unit; and
   a position information storage unit storing position information extracted by the position information extraction unit together with information about the terminal determined by said terminal determination unit.

4. The apparatus according to claim 3, further comprising an application linking apparatus for link with an application of a service provider for providing a service for a user, wherein
   said application linking apparatus can further comprise a position information retrieval unit for retrieving position information about a specified user by said position information storage unit in response to a request from the application of the service provider, and for notifying the application side of the retrieved position information.

5. The apparatus according to claim 3, wherein
   each time position information is announced from an information terminal of a user, said terminal determination unit can determine the type of information terminal, said position information extraction unit can extract position information, and said position information storage unit can store latest position information and terminal information.

6. The apparatus according to claim 1, further comprising:
   a user authentication unit authenticating a user of a terminal which has announced position information; and
   a position information storage unit storing position information extracted by said position information extraction unit together with information about the terminal determined by said terminal determination unit corresponding to an authenticated user, wherein
   when position information is simultaneously announced from a plurality of information terminals of the user, a policy of prioritizing the announced position information from the plurality of information terminals is set as a system operation environment; and
   said position information storage unit can store position information from an information terminal prioritized by the policy.

7. The apparatus according to claim 1, further comprising an application linking apparatus for link with an application of a service provider for providing a service for a user.

8. The apparatus according to claim 7, wherein
   said application linking apparatus comprises an event notification unit for receiving designation of a condition including an area from a service provider in advance, and notifying the application side of the data relating to the user when the user satisfies the designated condition.

9. The apparatus according to claim 7, wherein
   said application linking apparatus comprises a position information reformat unit for receiving a request from a service provider, and reformatting position information about a user extracted by the position information extraction unit.

10. The apparatus according to claim 7, wherein
    said application linking apparatus comprises an accounting unit for performing a process for charging a fee to a service provider that charges a user a fee for the communications established between the service provider and the user by the link with the application.

11. A method for obtaining position information about a user of plural types of information terminals, comprising:
    receiving data including position information from service-asynchronous information terminals that announce position information independent of requesting a service and that support plural types of different communications protocol and/or data format;

receiving data including position information from service-synchronous information terminals that announce position information when requesting a service and that support plural types of different communications protocol and/or data format;

converting the received data from the service-asynchronous information terminals to the same format as the data received from the service-synchronous information terminals; and receiving the converted data of the service-asynchronous information terminals with the data of said service-synchronous information terminals, said service-asynchronous information terminals and said service-synchronous information terminals receiving services from across multiple service providers; and wherein said receiving the converted data of said service-asynchronous information terminals and the data of said service-synchronous information terminals comprises;

determining a type of an information terminal by the data transmitted from the information terminal of a user according to which a communication protocol and/or data format is employed for the data transmitted from the information terminal, and extracting the position information about the user from the data transmitted from the information terminal depending on a result of said determining, where a service of the service providers is provided to the plural types of information terminals based on the position information received from the service-synchronous and the service asynchronous information terminals.

12. A computer-readable storage medium storing a program used to direct a computer forming an apparatus for obtaining position information about a user of plural types of information terminals, comprising:

receiving data including position information from service-asynchronous information terminals that announce position information independent of requesting a service and that support plural types of different communications protocol and/or data format; receiving data including position information from service-synchronous information terminals that announce position information when requesting a service and that support plural types of different communications protocol and/or data format;

converting the received data from the service-asynchronous information terminals to the same format as the data received from the service-synchronous information terminals; and receiving the converted data of the service-asynchronous information terminals with the data of said service-synchronous information terminals; said service-asynchronous information terminals and said service-synchronous information terminals receiving services from across multiple service providers; and wherein said receiving the converted data of said service-asynchronous information terminals and the data of said service-synchronous information terminals comprises determining a type of an information terminal by the data transmitted from the information terminal of a user according to which a communications protocol and/or data format is employed for the data transmitted from the information terminal, and extracting the position information about the user from the data transmitted from the information terminal depending on a result of said determining, where a service of the service providers is provided to the plural types of information terminals based on the position information received from the service-synchronous and the service-asynchronous information terminals.

13. A system of obtaining, managing, and using a status and a position of a user in an information terminal, comprising:

a service synchronous position information acquisition unit for acquiring position information about a service synchronous information terminal according to a first communications protocol which announces position information when a user requests a service; and a service asynchronous position information acquisition unit for acquiring position information about a service asynchronous information terminal which announces position information independent of requesting a service, converting the position information of the service asynchronous information terminal according to various communications protocols depending on the information terminal to position information according to the first communications protocol when the user requests the service, and transmitting the position information to the service synchronous position information acquisition unit according to the converted first communications protocol, where said service synchronous position information acquisition unit comprises:

a position information management unit for managing the status and position information acquired according to the first communications protocol per user rather than per information terminal; and an application link unit capable of retrieving service information according to the status and position information about a user from a user database and notifying a service provider of the information, where services from across multiple service providers are provided across said service-asynchronous information terminals and said service-synchronous information terminals based on the position information received by the service synchronous position information acquisition unit.

14. The system according to claim 13, wherein said service synchronous position information acquisition unit absorbs the difference in the technology of the information terminal and the carrier, and acquires the position information about a user.

15. An apparatus which acquires position information about a user of plural types of information terminals, comprising:

means for receiving data including position information from service-asynchronous information terminals that announce position information independent of requesting a service and that support plural types of different communications protocol and/or data format; and means for receiving data including position information from service-synchronous information terminals that announce position information when requesting a service and that support plural types of different communications protocol and/or data format;

wherein said means for receiving data from the service-asynchronous information terminals includes means for converting the received data of the service-asynchronous information terminals to the same format as the data received by the means for receiving data from the service-synchronous information terminals;

said means for receiving data from the service-synchronous information terminals includes means for receiving the converted data from the service-asynchronous information terminals, said service-asynchronous information terminals and said service-synchronous information terminals receiving services from across multiple service providers; and said means for receiving data from the service-synchronous information terminals comprises:

a terminal determination means for determining a type of the information terminal depending on data transmitted from the information terminal of the user according to which a communications protocol and/or data format is employed for the data transmitted from the information terminal, and a position information extraction means for extracting position information about the user from the data transmitted from the information terminal in response to the determination result, where a service of the service providers is provided to said service-asynchronous information terminals and said service-synchronous information terminals based on the position information received by said means for receiving data from the service-synchronous information terminals.

* * * * *

UNITED STATES PATENT AND TRADEMARK OFFICE
CERTIFICATE OF CORRECTION

| | | |
|---|---|---|
| PATENT NO. | : 7,356,344 B2 | Page 1 of 1 |
| APPLICATION NO. | : 10/751485 | |
| DATED | : April 8, 2008 | |
| INVENTOR(S) | : Tatsuhiro Sato | |

It is certified that error appears in the above-identified patent and that said Letters Patent is hereby corrected as shown below:

Title Page, Column 2 (Other References), Line 9, change "Suplementary" to --Supplementary--.

Signed and Sealed this

Nineteenth Day of August, 2008

JON W. DUDAS
*Director of the United States Patent and Trademark Office*